US006629696B1

(12) United States Patent
Voss

(10) Patent No.: US 6,629,696 B1
(45) Date of Patent: Oct. 7, 2003

(54) PLASTIC SECTION FOR SEALING GAPS BETWEEN TWO MOTOR VEHICLE BODY PARTS

(75) Inventor: Klaus-Wilhelm Voss, Uetersen (DE)

(73) Assignee: Vosschemie GmbH, Uetersen (DE)

( * ) Notice: Subject to any disclaimer, the term of this patent is extended or adjusted under 35 U.S.C. 154(b) by 0 days.

(21) Appl. No.: 09/582,770

(22) PCT Filed: Aug. 17, 1998

(86) PCT No.: PCT/EP98/05179

§ 371 (c)(1), (2), (4) Date: Aug. 8, 2000

(87) PCT Pub. No.: WO99/49986

PCT Pub. Date: Oct. 7, 1999

(30) Foreign Application Priority Data

| | | |
|---|---|---|
| Mar. 28, 1998 | (DE) | 298 05 733 U |
| Apr. 10, 1998 | (DE) | 298 06 610 U |
| Aug. 6, 1998 | (DE) | 298 14 107 U |

(51) Int. Cl.[7] ........ F16J 15/02

(52) U.S. Cl. ........ 277/630; 277/637; 277/644; 277/652; 277/906; 277/921

(58) Field of Search ........ 277/630, 637, 277/644, 650, 652, 906, 921

(56) References Cited

U.S. PATENT DOCUMENTS 1,960,137 A * 5/1934 Brown
2,275,235 A * 3/1942 Shanklin et al.
3,064,853 A * 11/1962 Lents et al.
3,271,232 A * 9/1966 Moore
3,357,137 A * 12/1967 Lombardi et al.
3,427,776 A * 2/1969 Lake et al.
3,634,565 A * 1/1972 Schaerer
3,758,992 A * 9/1973 Olson ........ 49/489
4,115,609 A * 9/1978 Denman ........ 428/68
4,501,432 A * 2/1985 Kuniyoshi et al.
4,570,948 A * 2/1986 Wunderlich et al.
4,740,256 A * 4/1988 Vosberg ........ 156/73.1
4,834,395 A * 5/1989 Benford
4,868,045 A * 9/1989 Horiki et al. ........ 428/314.4
4,996,092 A * 2/1991 Francis et al. ........ 428/157
5,128,176 A 7/1992 Schmidt
5,260,097 A * 11/1993 Silvestre ........ 427/282
5,407,716 A * 4/1995 Mitchell ........ 428/40
5,413,637 A * 5/1995 Bastow ........ 118/505
5,547,725 A * 8/1996 Barrows et al. ........ 428/43
5,692,758 A * 12/1997 Wilkstrom
5,939,173 A * 8/1999 Voss ........ 428/158
5,944,323 A * 8/1999 Cavka ........ 277/626

FOREIGN PATENT DOCUMENTS

| | | |
|---|---|---|
| EP | 0795356 | 9/1997 |
| WO | 9521700 | 8/1995 |

OTHER PUBLICATIONS

Patent Abstracts of Japan, vol. 097, No. 006, Jun. 30, 1997 & JP 09 049569 A (Bridgestone Kaseihin Tokyo KK), Feb. 18, 1997.

* cited by examiner

*Primary Examiner*—Anthony Knight
*Assistant Examiner*—Alison K. Pickard
(74) *Attorney, Agent, or Firm*—Friedrich Kueffner

(57) ABSTRACT

A plastic profile for the gap sealing of two car body parts (28, 30) of vehicles, especially for repair enamelling work on vehicles, with an adhesive agent (42) for the removable attachment of the strip-shaped plastic profile (200; 300; 400; 500; 500'; 500") to a surface for avoiding an edge development and an enamel accumulation in the edge area due to enamel mist at the contact points between a plastic profile brought in into the gap of two car body parts for repair enamelling on vehicles and the car body parts, the plastic profile (200) is configured as a fat profile with a rectangular or a square cross section, at least one corner area (40) of one of the two sides (14, 15) of the plastic profile (200) running transversely to the profile longitudinal direction being rounded, an adhesive coating (42) being provided for in the rounded profile area.

31 Claims, 34 Drawing Sheets

Fig. 11
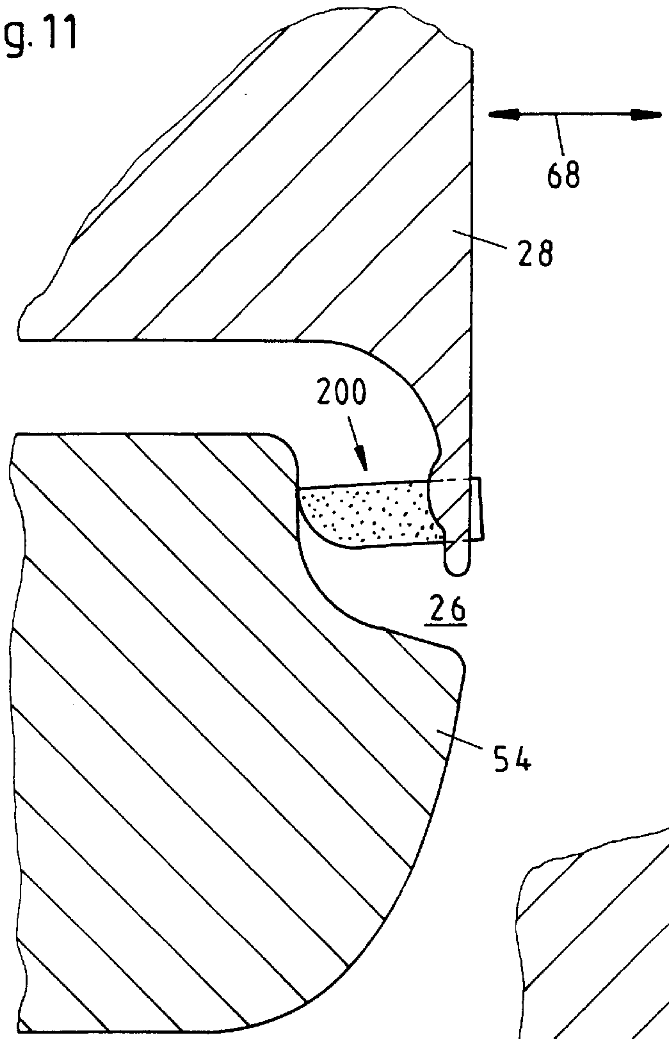
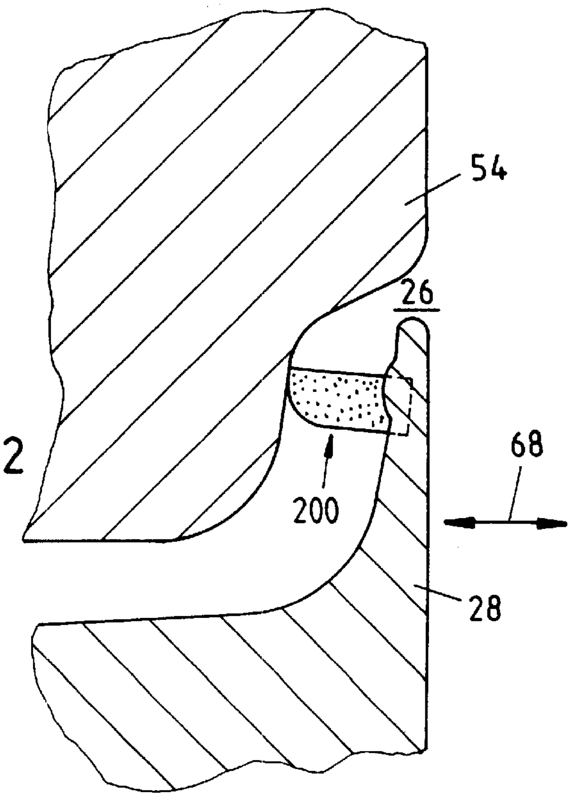
Fig. 12

Fig.17
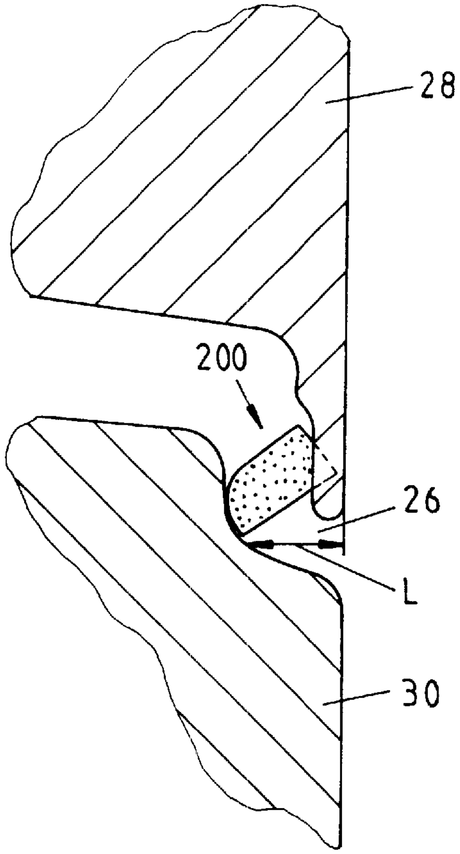
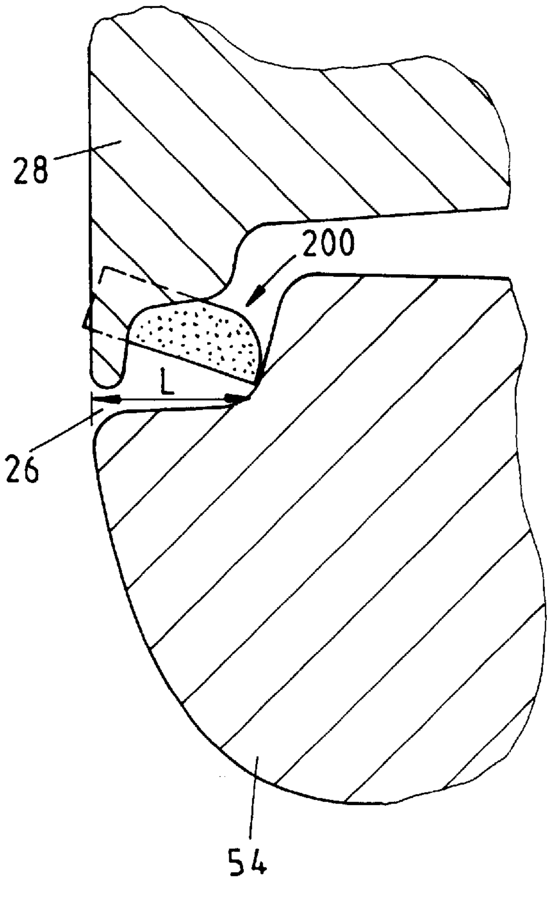
Fig. 18

PLASTIC SECTION FOR SEALING GAPS BETWEEN TWO MOTOR VEHICLE BODY PARTS

FIELD OF APPLICATION

The invention relates to a plastic profile for the gap sealing of two car body parts of vehicles, especially for repair enamelling work on vehicles, with an adhesive agent for the removable attachment of the strip-shaped plastic profile to a surface.

Prior art

For the preparation for example of a car body for repair enamelling, it is generally necessary to mask certain parts or fields so that these parts do not get contact with a spray enamel when enamelling later on. Adhesive strips, plastic strips, joint sealing strips and/or foam strips are appropriate means for this purpose.

For the repair enamelling of vehicles, in most cases, only a part of the car body is repaired. Such partial repairs come by estimation to 90% in an automotive paint shop as against 10% of all vehicle enamelling.

For this purpose, parts of a vehicle have to be masked with paper, foil or a correspondingly appropriate masking means so that only the part to be repaired is enamelled. The delimitations take place almost always in the area of joints. But for this purpose, it is necessary that these joints are protected against penetrating paint mist.

Thus the DE 41 06 960 A1 describes a device for the temporary bridging over of car body joints and gaps or the like to avoid the penetration of abrasive means or of enamel particles during the corresponding treatment of car bodies with at least one adhesive coating for fixing to car body elements. For this purpose, the device is configured as an approximately triangular solid profile made of a flexible foam plastic, of rubber or the like with an adhesive coating on at least one of the three sides. However, this device has the drawback according to which, for certain fitting positions, a filling material applied before enamelling concentrates in edge areas of gaps of car body parts sealed with this device but that this filling material is not completely covered with enamel during the enamelling step. After removal of the device, a strip is formed in the colour of the filling material, thus in another colour than that of the applied enamel. The term “filling material” designates for example a filler applied beforehand for levelling up the unevenness of a surface to be enamelled.

The EP 0 365 510 A1 describes a method and a means for masking at least one part of a surface to be treated, whereby an element which is resistant to surface treatment, is removably fixed on the part of said surface and is removed after completion of the treatment. A compressible padding is applied as an element on at least one part of the irregularity on the surface, whereby the padding can be adapted to the irregularity onto which it is applied. This padding is a round profile. The contact points between the padding and a respective car body part are however placed very near by the gap between the car body parts and are thus greatly subject to an enamel mist. At these points, there are more often undesirable edge developments, since the shape of the contact points further supports an aggregation of enamel particles.

Aim, Solution, Advantage

The aim of this invention is to make available an improved plastic profile of the above mentioned type which eliminates the above mentioned drawbacks, whereby in particular the development of edges due to the enamel mist applied to the contact points and contact areas between the plastic profile and the car body parts is to be avoided, i.e. an enamel concentration in the edge area is to be prevented.

This aim is achieved by a plastic profile of the above mentioned type with the characteristics indicated in claim 1.

For this purpose, the invention provides for a plastic profile that this plastic profile is configured with a square or a rectangular cross section, at least one corner of the rectangular cross section being configured rounded, namely either in form of a quarter circle or in form of a half-circle, the half-circle profile extending then over the whole side running transversely to the profile longitudinal direction.

A plastic profile with such a configuration is used or handled for gap sealing as follows:

(a) Fixing of the plastic profile in a gap area by means of the adhesive means on the fixed car body part, the movable car body part being in an opened state, (b) Closing of the movable car body part, (c) Pressing in of the plastic profile into the gap to be sealed by compressing it and (d) Further pressing in of the plastic profile into the gap to be sealed in such a manner that the bow-shaped configured side of the plastic profile is set back by a predetermined length into the gap to be sealed.

This has the advantage that the development of edges due to applied enamel is efficiently avoided when enamelling, i.e. there is no concentration of enamel in the edge area.

The use of the plastic profile takes place in such a way that the rounded corner of the plastic profile is placed on the fixed car body part in such a way that a contact point of the rounded corner with the fixed car body part is spaced from the gap by a length L, the length L being bigger than the width of the gap.

This has the advantage that a risk of edge development at the contact points between the plastic profile and the car body parts is efficiently reduced, since these contact points are spaced from the gap by a substantial extent and that thus enamel mist cannot directly come into the relatively big hollow space between the gap and the plastic profile to these contact points, but only when deeply penetrating. In other words, the gap protects the contact points from the enamel mist through its substantially smaller extent concerning the distance of the contact points from the gap.

Because the length L is chosen such that the surface of the hollow space between the gap and the plastic profile is four times bigger than the gap itself, we obtain the advantage that an enamel precipitation in the hollow space is approximately four times as little as on the surfaces to be enamelled.

Preferable further improvements of the plastic profile are described in the subclaims.

Thus, in the preferred embodiment of the invention, the long side of the rectangular cross section shows a length of 15 mm to 25 mm, especially of 20 mm or 24 mm, and the short side of the rectangular cross section a length of 8 mm to 10 mm, especially of 9 mm.

For sealing particularly wide gaps, at least two identical plastic profiles are arranged in a row and connected with each other over a nominal crack point at one of the short places of the rectangular cross section which are opposite the rounded corner.

An endless band made of plastic profiles according to the invention with a corresponding simple and field-experienced usability is obtained by the fact that at least two identical plastic profiles are connected in series with each other over a nominal crack point on the short sides of the rectangular cross section, the at least one corner of which being rounded.

For fixing the plastic profile according to the invention for a mounting in a gap before wedging by closing the movable car body part, the adhesive means is placed at at least one long side of the rectangular as well as on the rounding of the cross section. Since an adhesive means is provided for on the rounding, a fitting in each desired angle is possible so that each gap width can be respectively taken into account.

The plastic profile is appropriately made of an absorbent material, in particular of a porous material such as for example foam.

The plastic profile is made of a material which resists to a surface treatment of the car body surface, in particular to enamelling.

There results a particularly simple and efficient arrangement if the bow-shaped side is configured as a cylinder cup partial segment of a cylinder with a certain radius or as a ball cup partial segment of a ball with a predetermined radius. This predetermined radius is for example 7 mm to 10 mm, in particular 8.5 mm or 8 mm.

For obtaining optimal transitions between reenamelled surfaces adjacent to the gap to be sealed and not reenamelled surfaces, the plastic profile is made of an absorbent porous material, in particular of foam.

According to a further embodiment, the adhesive means is placed in the rounded corner. This has the advantage that, with such a profile, each desired angle of the profile can be adjusted inside the gap.

The rounded corner is appropriately configured as an arc of a circle which preferably shows a radius of for example 7 mm to 10 mm, especially of 8.5 mm.

According to a further embodiment of the invention, the plastic profile consists of a profile with a rectangular cross section with longitudinal sides running parallel to each other and in profile longitudinal direction and with narrow sides running transversely to the profile longitudinal direction, a first narrow side of the two narrow sides being rounded and the rounded section showing an adhesive coating and changing to a linearly running section which runs obliquely to the second narrow side and which is prolongated over the longitudinal side of the profile by constituting an approximately triangular surface section and which changes into this with a section, and the second narrow side opposite the bow-shaped section changing into the longitudinal side of the profile by constituting a step over a section running obliquely in direction of the bow-shaped section.

Because of the applying of adhesive substance, it is necessary for this embodiment of a plastic profile that the strip-shaped profiles are set in in tilted position. This specific configuration of the profiles results from this since, for providing a perforation for the later cutting off of individual strips from a strip assembly, the perforation can be made by means of a roller crush cutter only in vertical direction.

Further advantageous configurations of the invention are the object of the subclaims.

SHORT DESCRIPTION OF THE DRAWINGS

Embodiments of the invention will be explained in detail below with reference to the annexed drawings.

FIGS. 6 to 11 show different examples for the arrangement of a plastic profile according to FIGS. 1 to 5 between a movable and a fixed car body part.

FIG. 12 shows an arrangement of a plastic profile according to FIG. 1 between a door of a vehicle and a sill beam laterally, at the back, at the bottom.

FIG. 17 is a rear view of an arrangement of a plastic profile according to FIG. 1 on a car body between a fixed car body part and a door.

FIG. 18 shows an arrangement of a plastic profile according to FIG. 1 on a car body between a fixed car body part and a door from the top.

DETAILED DESCRIPTION OF THE INVENTION AND BEST WAY FOR CARRYING OUT THE INVENTION

Figure 1:
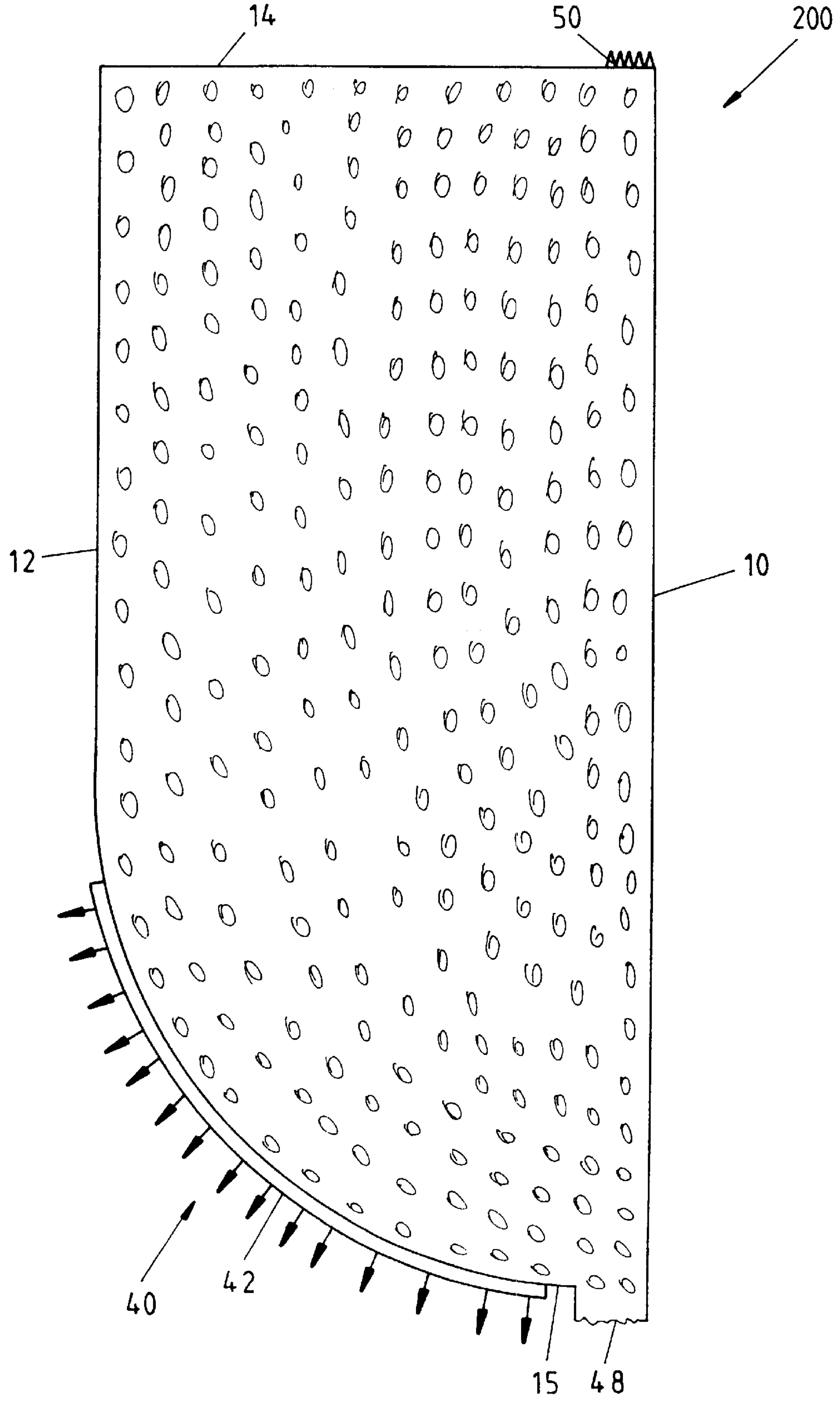
FIG. 1 shows in a sectional view a plastic profile with a rectangular cross section and with a quarter circle profile carrying an adhesive coating in the area of the short profil side.
Figure 2:
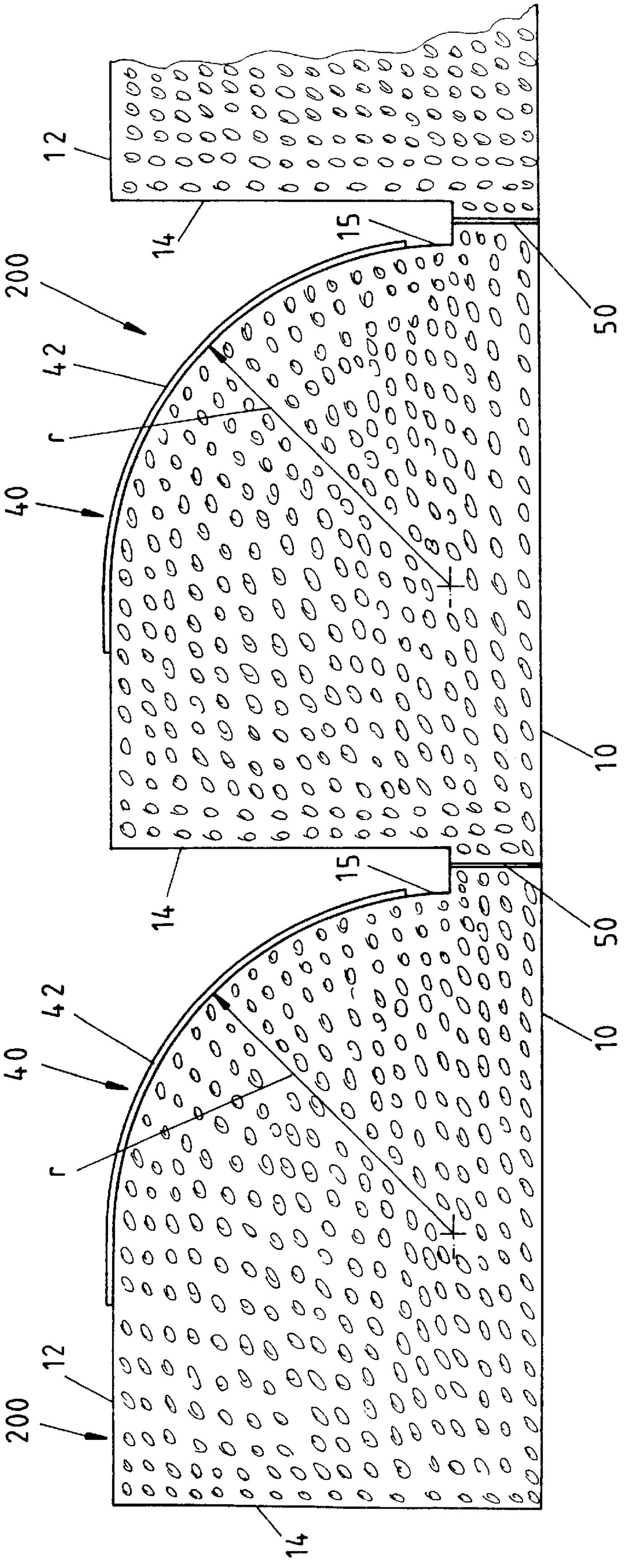
FIG. 2 shows an arrangement of three connected plastic profiles according to FIG. 1 which are connected with each other over a tear-off edge.
Figure 3:
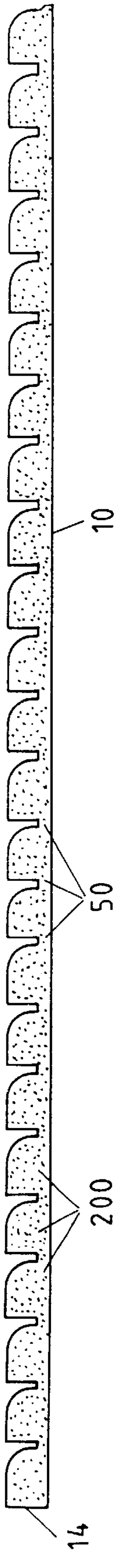
FIGS. 3 to 5 show respective row arrangements of several plastic profiles according to FIG. 1, the plastic profiles being connected with each other over tear-off edges.
Figure 4:
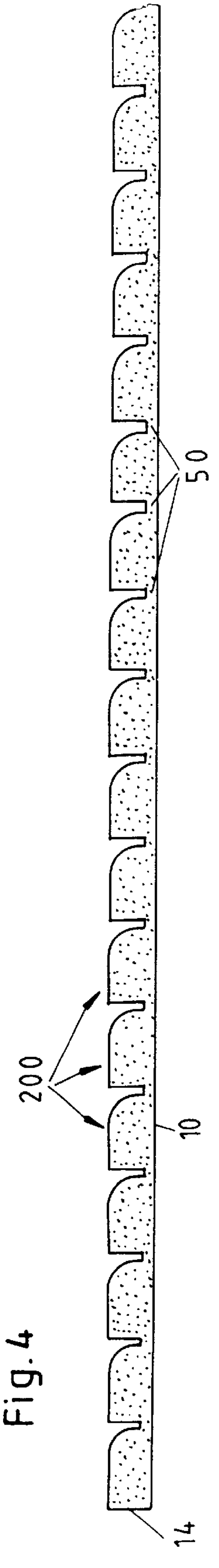
Figure 5:
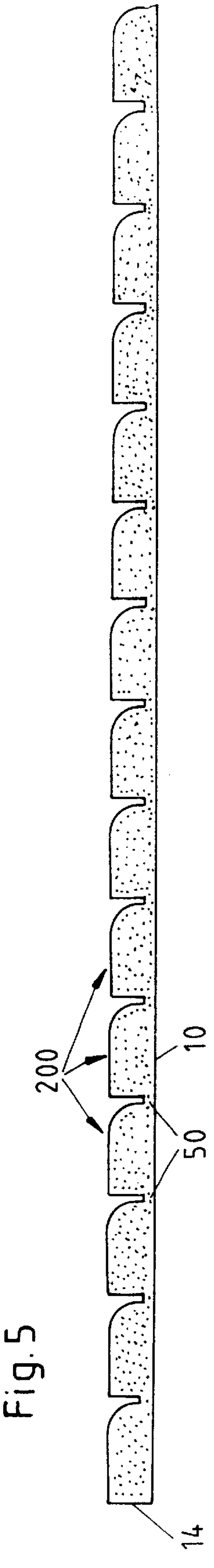

The embodiment represented in FIGS. 1 and 2 of a plastic profile 200 in form of a sealing strip shows a substantially rectangular cross section with two long sides 10, 12 and with two short sides 14, 15. The short side 15 has a bow-shaped configured cross section, for example a quarter circle cross section (FIG. 1). For the plastic profile 200, only one edge is rounded between the short sides 15 and the long side 12, namely in form of a quarter circle, the center of the circle radius being approximately situated in the long side 10; however, it is possible to place the center of the circle radius outside the side 10 so that a flat partial arc of a circle is obtained. An adhesive coating 42 is provided for on this rounded edge 40. The adhesive coating is, for example, a hot melt coating. The difference between the plastic profiles of FIGS. 1 and 2 only consists in the respective length of the long sides 10, 12 and of the short sides 14, 15. In the embodiment of FIG. 1, the long sides 10, 12 have a length of approximately 20 mm and the short sides 14, 15 a length of approximately 9 mm. In the embodiment of FIG. 2 the long sides 10, 12 have, for example, a length of approximately 15 mm and the short sides 14, 15 a length of approximately 8 mm. Thus there result respectively different length ratios between the long and the short sides of the rectangular plastic profile.

Figure 8:
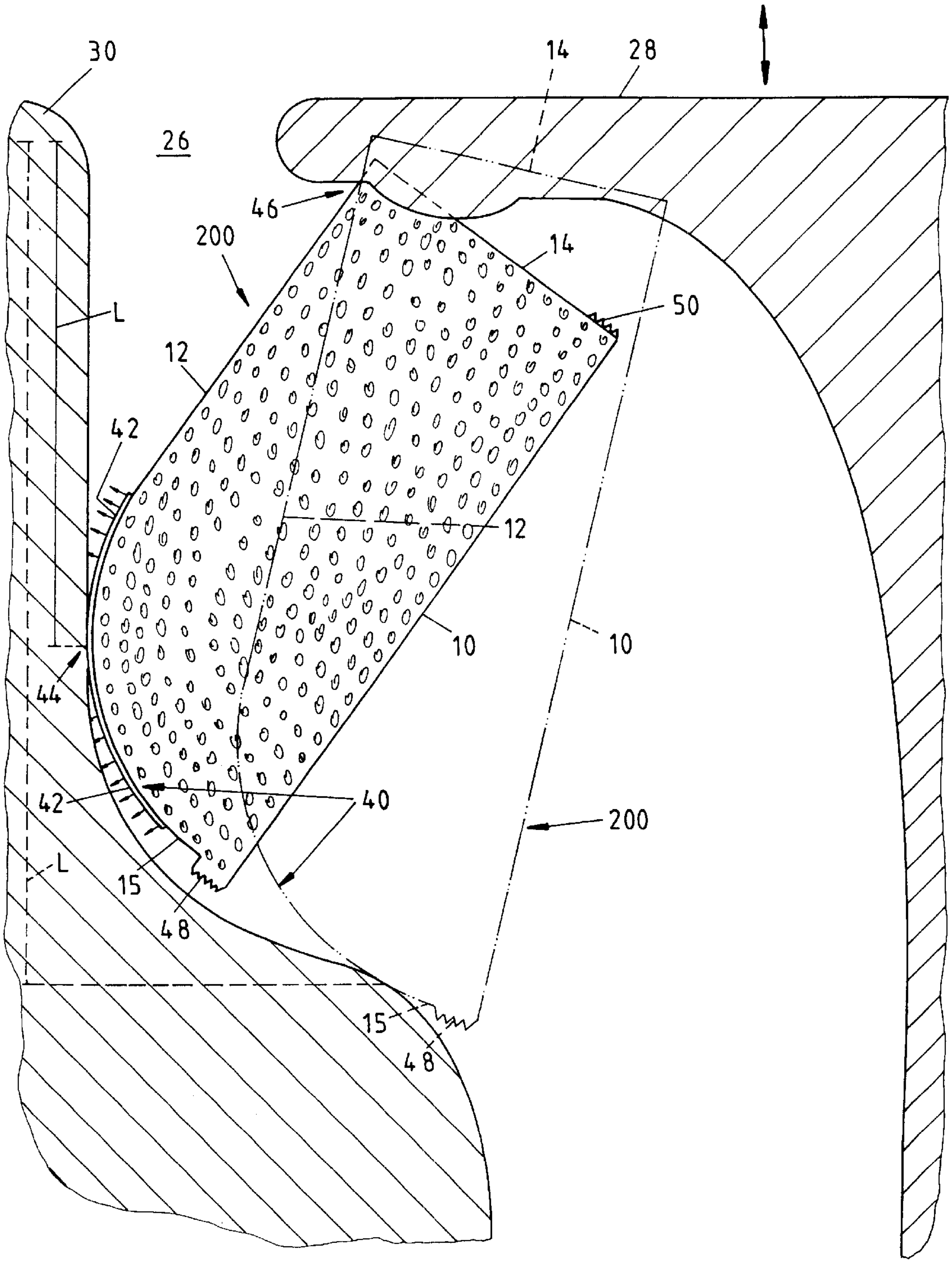
Figure 9:
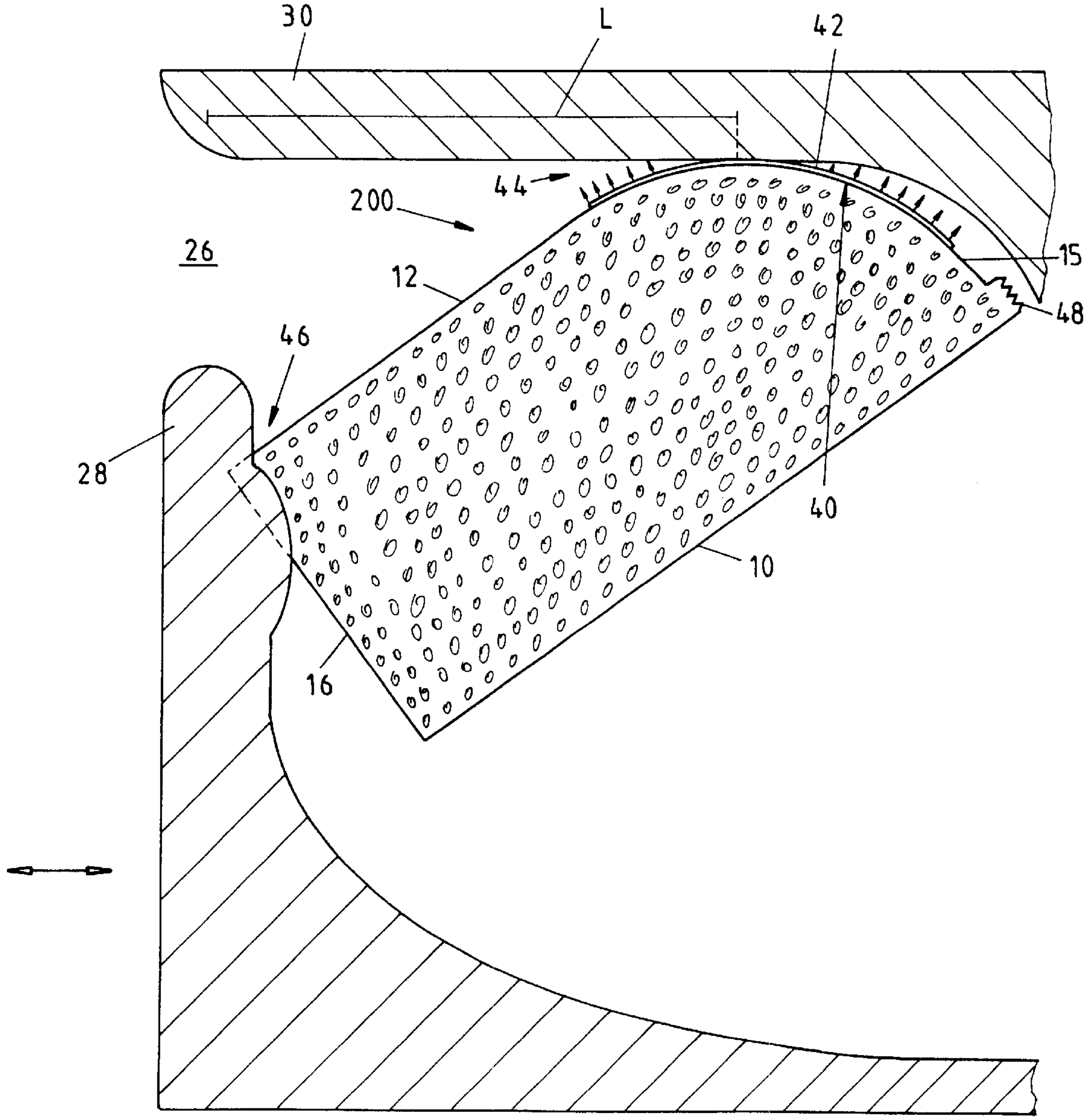
Figure 10:
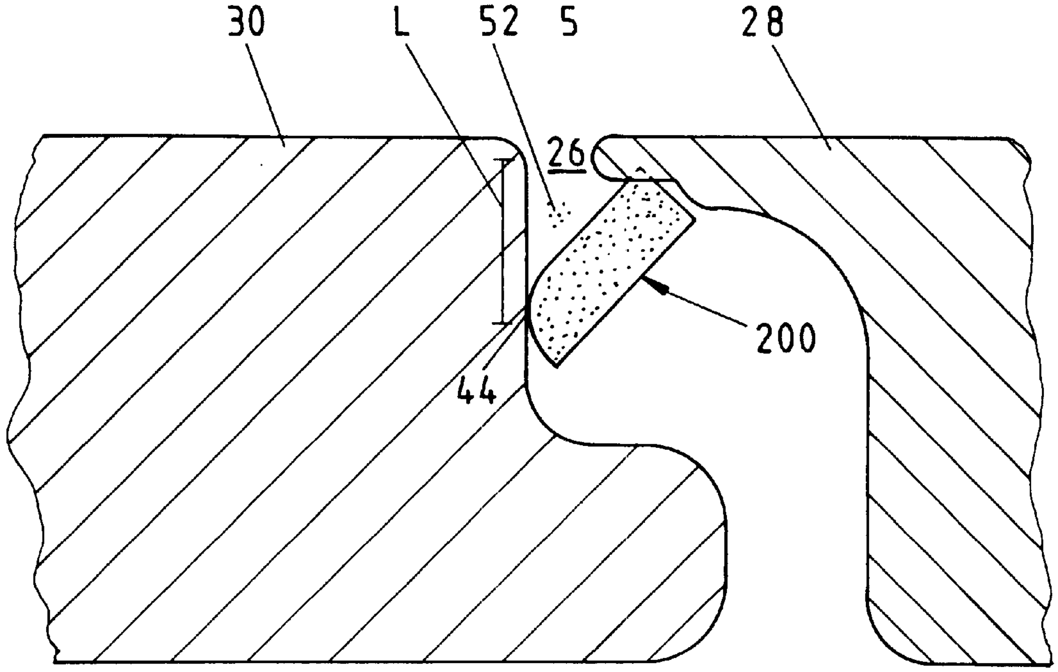
Figure 13:
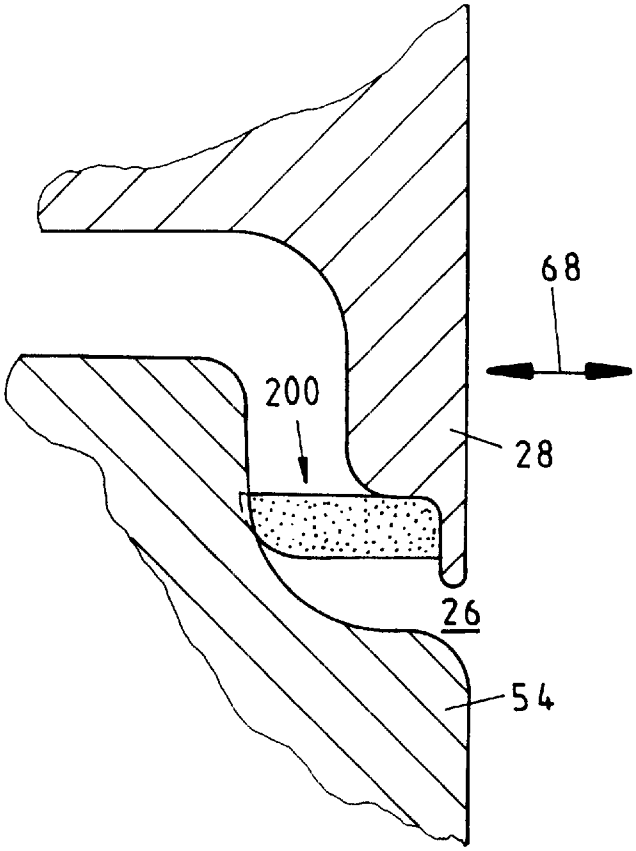
FIG. 13 shows an arrangement of a plastic profile according to FIG. 1 between a door of a vehicle and a sill beam laterally, at the back, on the top.
Figure 14:
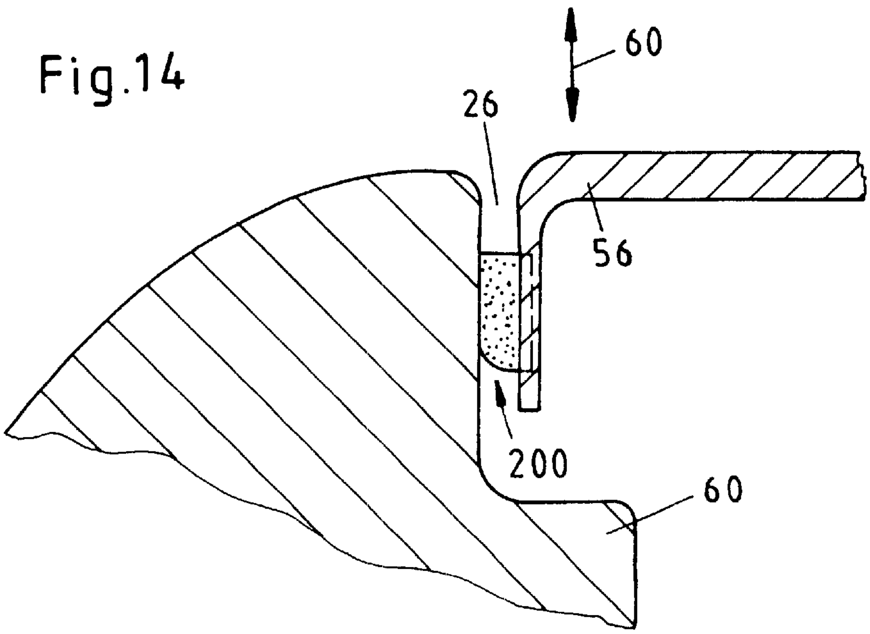
FIG. 14 shows an arrangement of a plastic profile according to FIG. 1 on a door of a vehicle laterally at the back.
Figure 15:
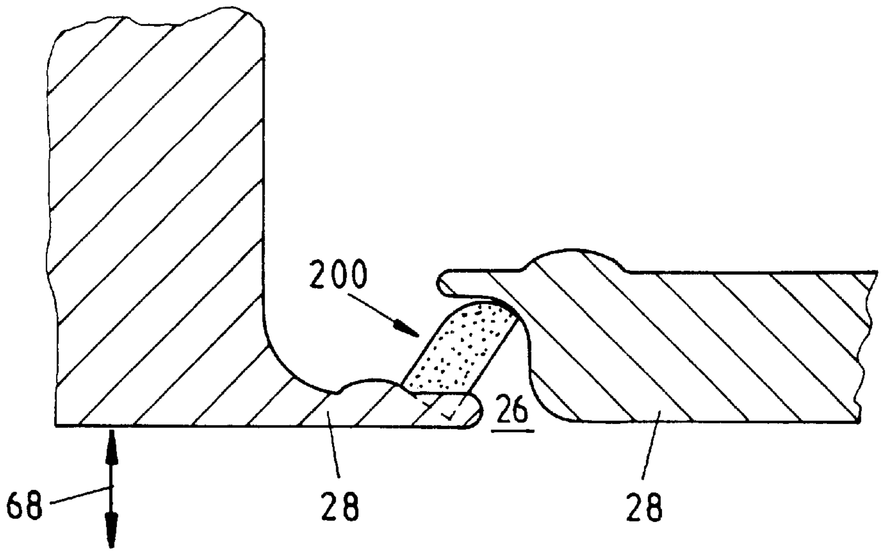
FIG. 15 shows an arrangement of a plastic profile according to FIG. 1 beween an engine hood and a front fender of a vehicle.
Figure 16:
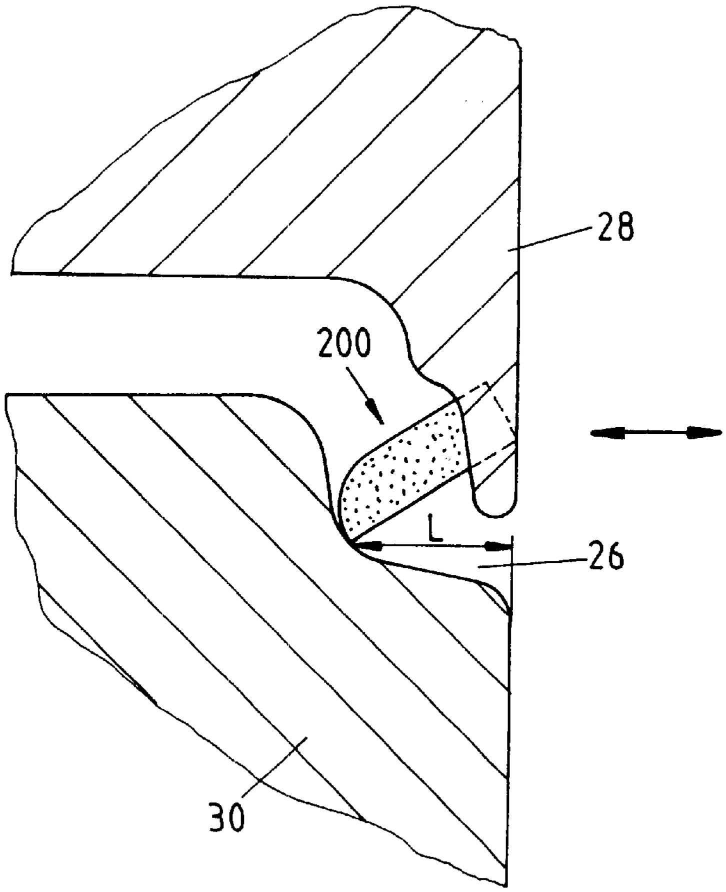
FIG. 16 shows an arrangement of a plastic profile according to FIG. 1 between a front door and a rear door of a vehicle.
Figure 19:
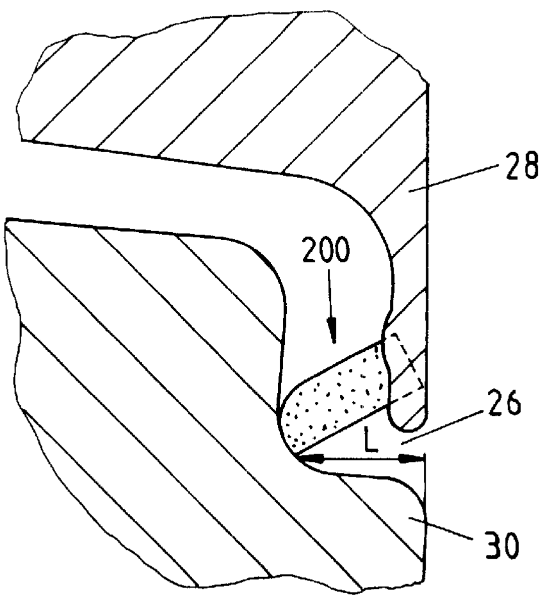
FIG. 19 shows an arrangement of a plastic profile according to FIG. 1 on a car body between a fixed car body part in form of a sill beam and a door from the bottom.
Figure 20:
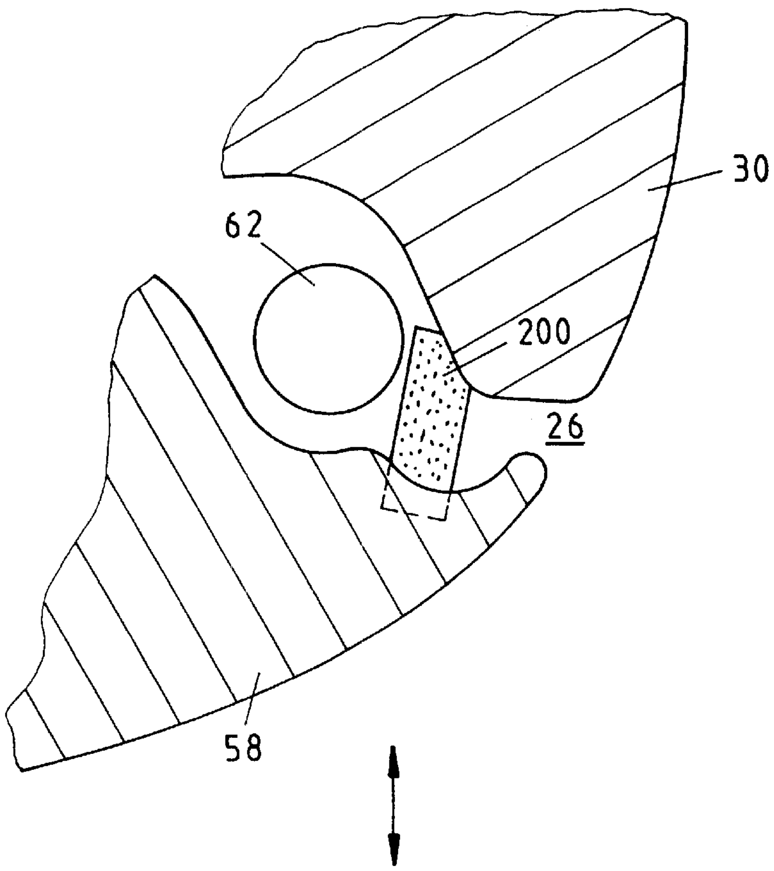
FIG. 20 shows an arrangement of a plastic profile according to FIG. 1 on a car body between a fixed car body part and at the side of a door.

Moreover, in FIGS. 1 and 2, tear-off edges 48 and 50 can be seen along which several plastic profiles 200 are connected with each other, as can be seen in FIGS. 8 to 10, eventually in a row the one behind the other. In this way the plastic profiles are available in a handy way, for example in form of rolls, and have only to be torn off from the roll or from the row the one after the other for being mounted.

FIG. 2 shows a row arrangement of plastic profiles 200. Hereby a short side 15 of a profile abuts against a short side 14 of an adjacent profile 200. The joint is again configured with a perforation or a tear-off edge 50 so that adjacent plastic profiles 200 can be separated the one from the other by simply tearing off. The short side 15 has a section with a not rounded profile with a length of approximately 0.5 mm to 2 mm, especially of 1 mm. The rounding is configured with a radius r of for example 8 mm.

The adhesive coating 42 extends on the rounded edge 40 over a predetermined section into a not rounded area of the long side 12. This predetermined section has, for example, a length of 1.5 mm.

FIGS. 2 to 5 show different row arrangements of plastic profiles 200 with a total length of respectively 360 mm each. The respective short sides 14 of these profiles have a length of approximately 10 mm. The embodiments according to FIGS. 3, 4 and 5 differ in the respective length of the long side 10 of respectively 15 mm, 20 mm and 24 mm. Thus, for a total length of the row arrangement of 360 mm, there result in FIG. 3 twenty four profiles 200 placed in a row, in FIG. 4 eighteen profiles 200 placed in a row and in FIG. 5 fifteen profiles 200 placed in a row.

FIG. 6 to 11 show different examples for mounting the plastic profiles 200 of FIGS. 1 to 2 between a fixed car body part 30 and a movable car body part 28. A plastic profile 200 is attached or fixed with the adhesive coating 42 to an inner side of the gap 26 to the fixed car body part 30, first the movable car body part 38 being open and then the movable car body part being closed into the position represented in FIGS. 6 to 11. As can be immediately seen in the figures, the contact point 44 is located between the plastic profile 200 and the fixed car body part 30 and is spaced from the gap 26 by a length L. Hereby the length L is much bigger than the gap 26 itself. The contact point 46 between the plastic profile 200 and the movable car body part 28 is also a little set back from the gap 26. In this way, less paint mist is precipitated at the contact points 44 and 46 than this is the case for the round profile according to the prior art, represented for comparison in FIG. 6, at the corresponding contact points A and B. These contact points are namely situated very near to the gap 26 because of the round profile configuration. This position of the contact points is absolutely imperative since otherwise the round profile would not seal the gap 26.

FIG. 8 shows two fitting positions for the plastic profile 200 with a respective different length of the long sides 10, 12. The plastic profile 200 represented with continuous lines has long sides 10, 12 with a length of approximately 20 mm, whereas the plastic profile 200 represented with dashed lines has long sides 10, 12 with a length of 25 mm. It is obvious that the fitting angle of the plastic profile 200 changes as well as the position of the contact point 44 between the plastic profile 200 and the fixed car body par 30 or the length L for different lengths of the long side 10, 12.

In FIG. 11 a paint mist is supplementary indicated by 52 in the gap 26.

Figure 6:
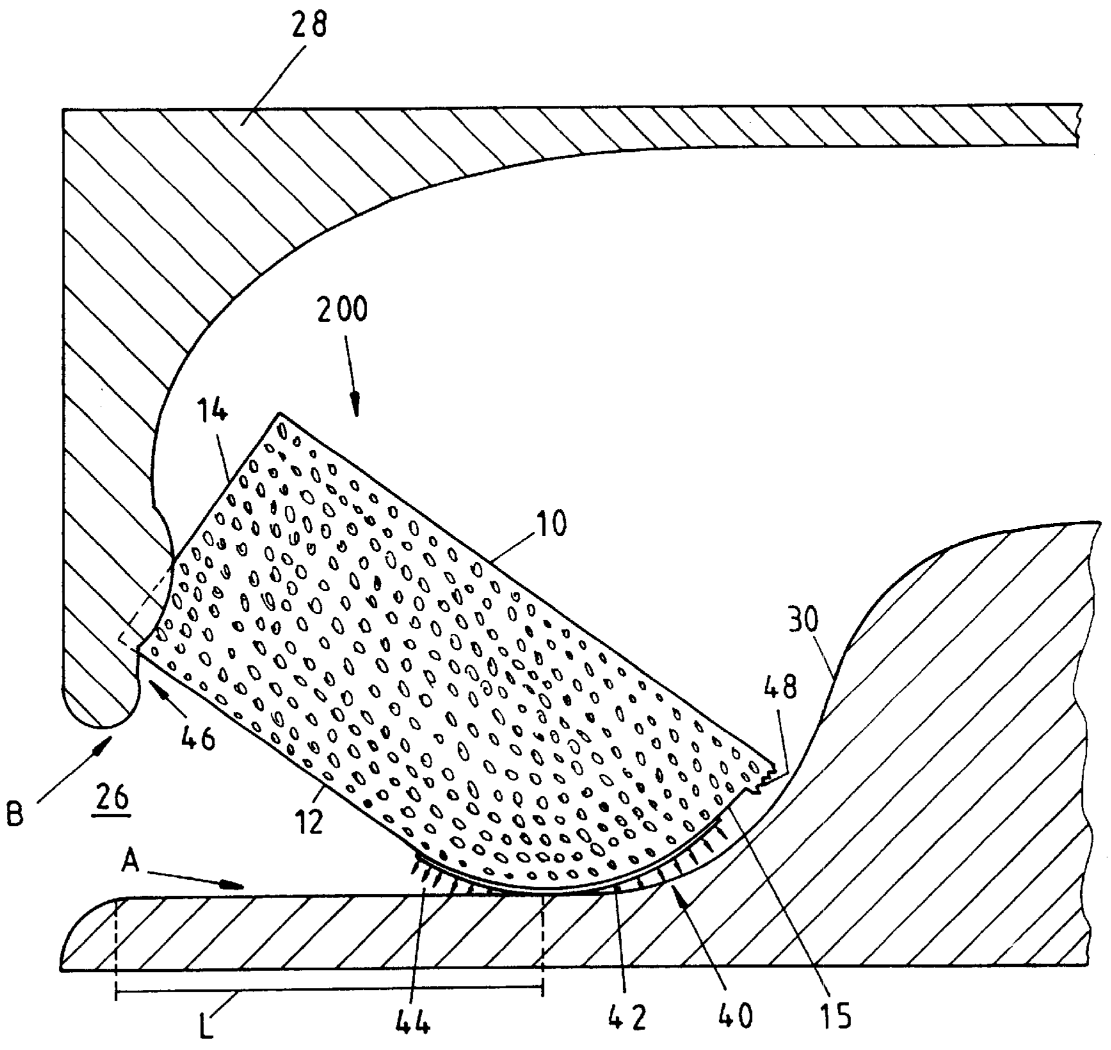
Figure 7:
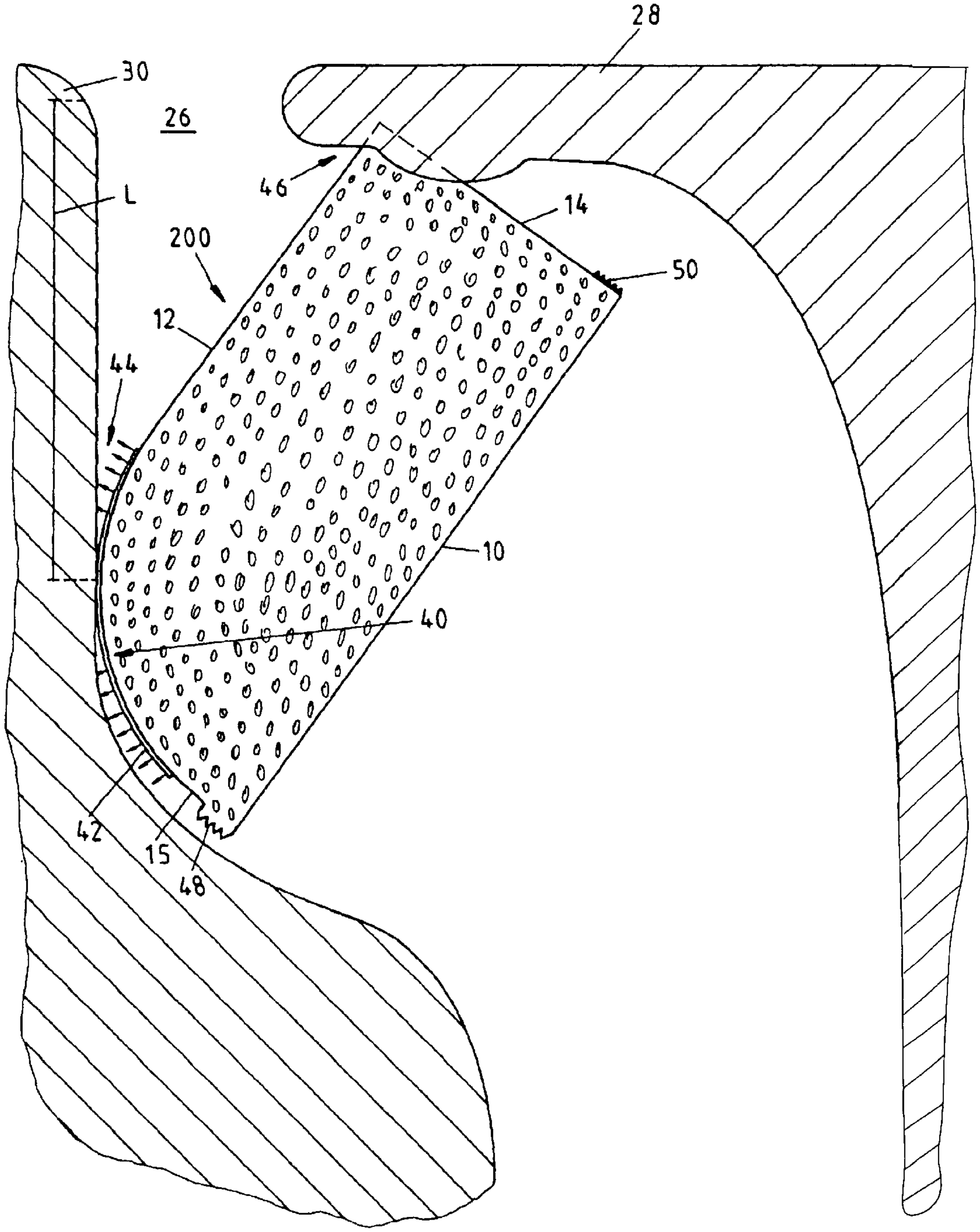

FIG. 9 shows a representation similar to FIGS. 6 to 8, the fixed car body part 30 and the movable car body part 28 being however placed mirror-inverted to each other, i.e. it is another opposed side of the car body.

For all arrangements according to FIGS. 6 to 11, it appears that the rounding 40 of the edge is particularly important. This makes possible to fix the plastic profile 200 in all desired angles in the gap 26. The gap width is, for example for a car body, usually 5 mm between the door and the door sill. For some car bodies, this width is however much less and is 3.5 mm. Until now, another sealing profile, specially adapted to the gap 26 and its width, had to be made available here. Compared to this, the sealing profile according to the invention is universally usable without construction changes, even for very different gap widths. This also does not require, as can be immediately seen in FIGS. 6 to 11, any or any supplementary expenditure of work, since only the fitting angle of the plastic profile 200 according to the invention in the gap has to be selected correspondingly.

Figure 21:
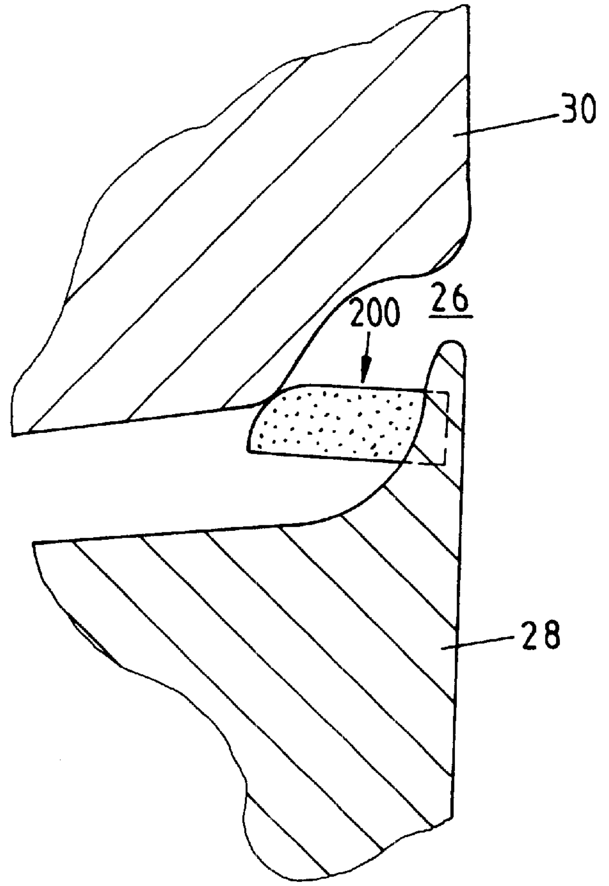
FIG. 21 shows an arrangement of a plastic profile according to FIG. 1 on a car body between a fixed car body part and at the side of a rear flap.
Figure 22:
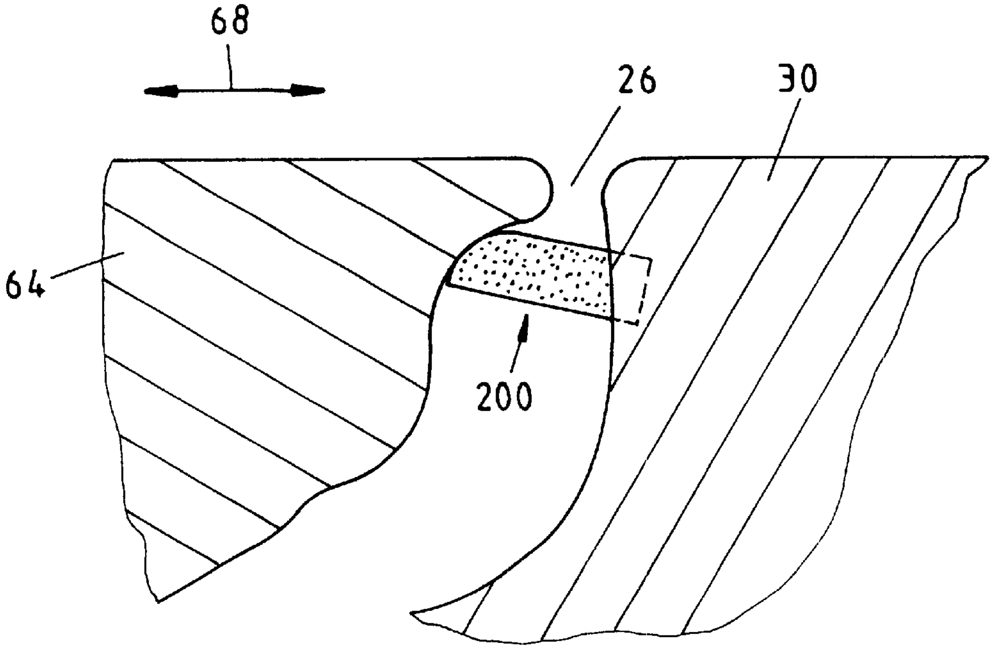
FIG. 22 shows an arrangement of a plastic profile according to FIG. 1 on a car body between a fixed car body part and a door.
Figure 23:
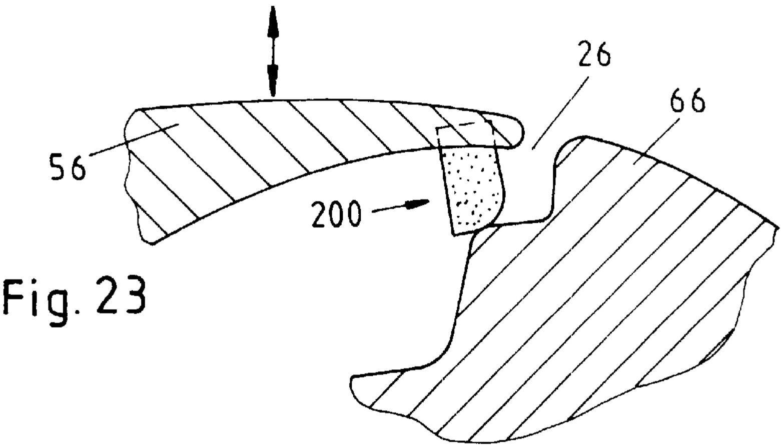
FIG. 23 shows an arrangement of a plastic profile according to FIG. 1 on a car body between a fixed car body part and a sliding door.
Figure 24:
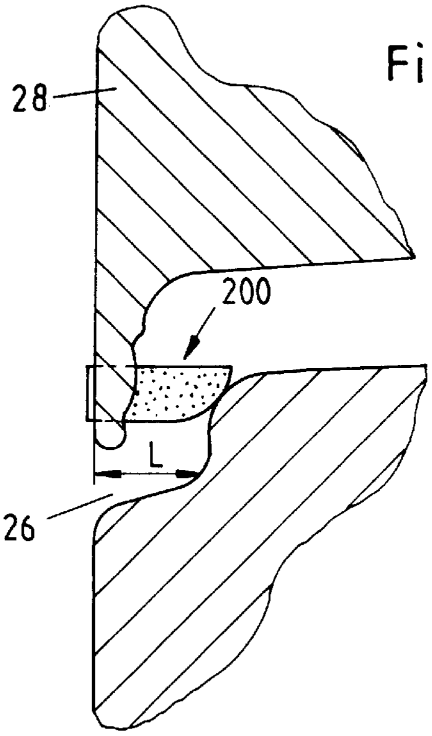
FIG. 24 shows an arrangement of a plastic profile according to FIG. 1 on a car body between a fixed car body part and an engine hood.
Figure 25:
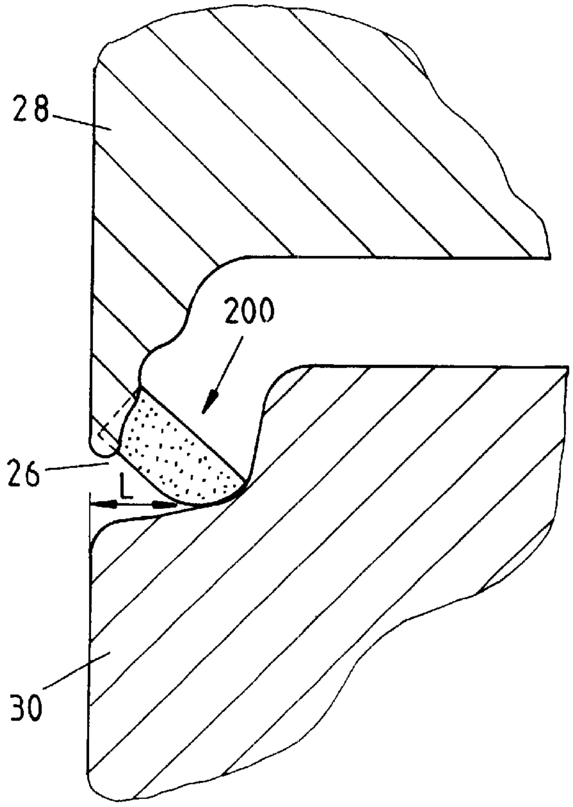
FIG. 25 shows an arrangement of a plastic profile according to FIG. 1 on a car body between a fixed car body part and a door from the top.
Figure 26:
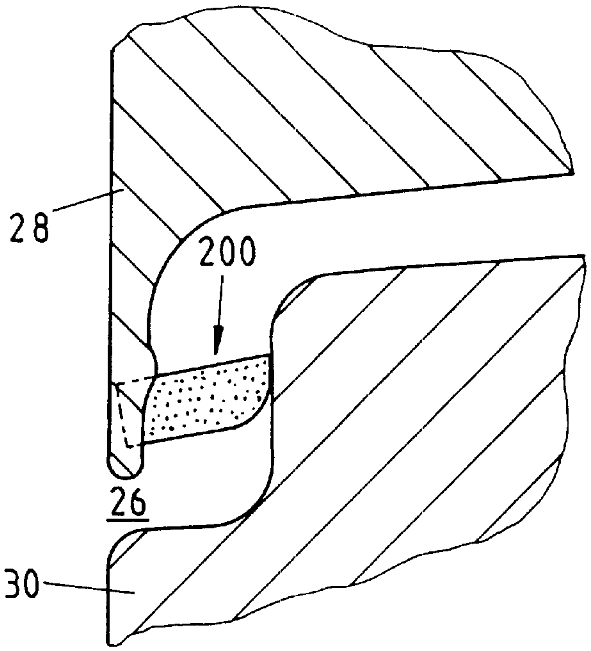
FIG. 26 shows an arrangement of a plastic profile according to FIG. 1 on a car body between a fixed car body part and a door from the bottom.
Figure 27:
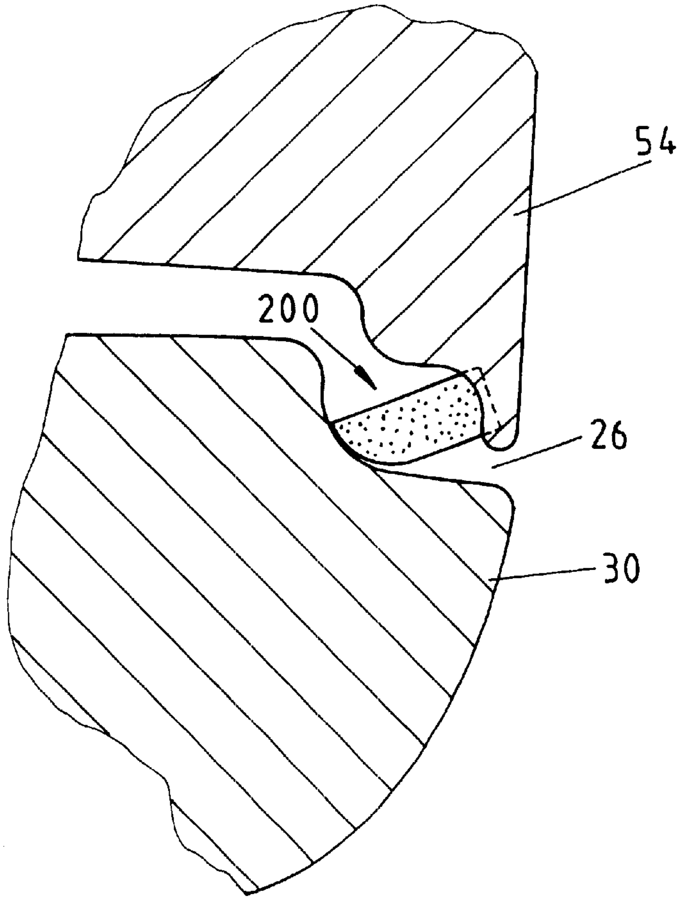
FIG. 27 shows an arrangement of a plastic profile according to FIG. 1 on a car body between a fixed car body part and at the side of a door.
Figure 28:
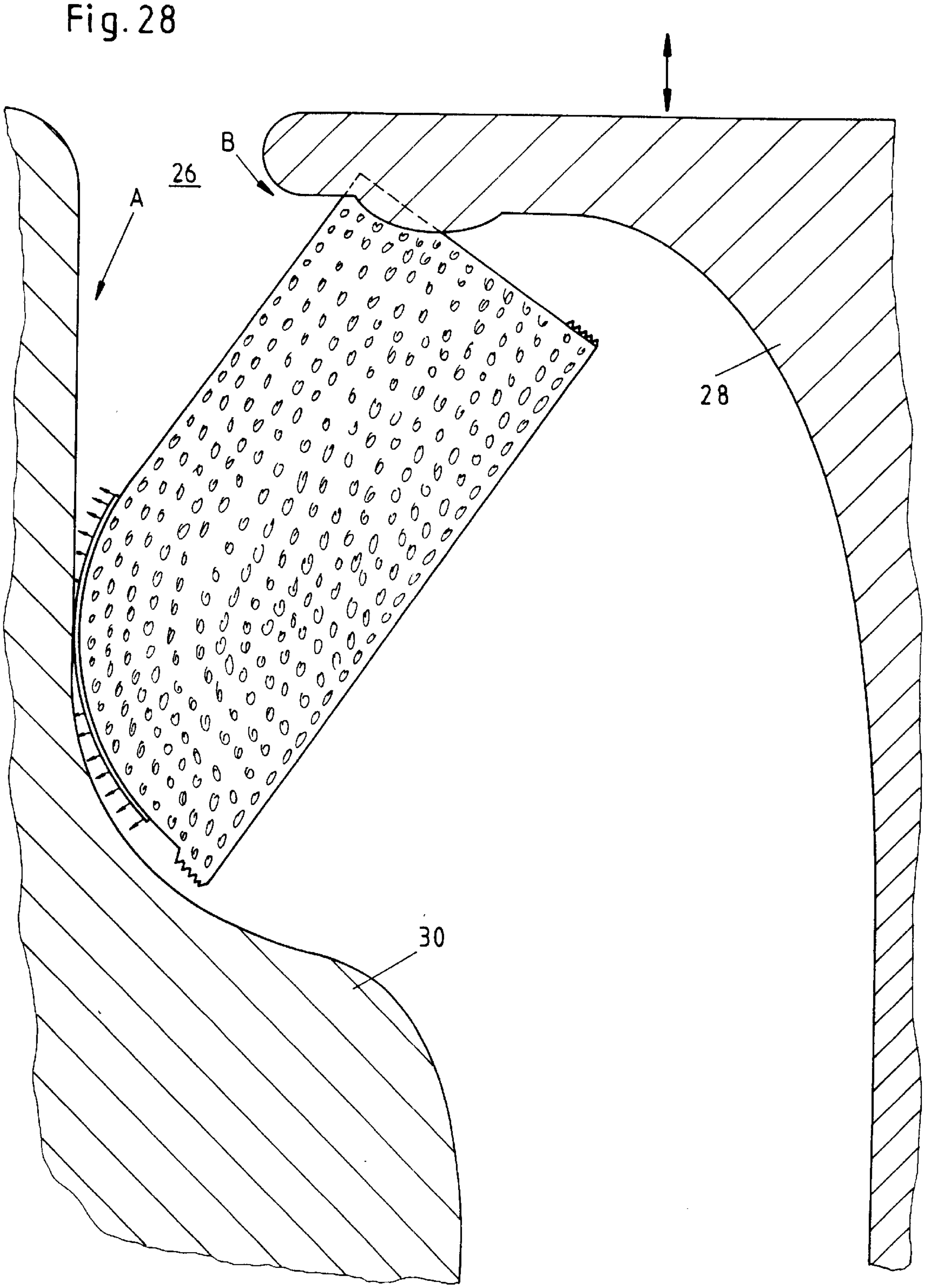
FIG. 28 shows an arrangement of a plastic profile according to FIG. 1 on a car body between a fixed car body part in form of a sill beam and a door from the bottom.

FIGS. 12 to 38 show further fitting examples for the plastic profile 200 respectively in a gap 26 between doors 28 or between the engine hood 56, the rear flap 58, the sliding door 64 and/or the door 28 and the sill beam 54, the front fender 60, the fender 66 and/or the fixed car body part 30. The length L is approximately 12 mm, 13 mm, 16 mm, 19 mm oder 20 mm. In FIG. 21, a fender 62 is additionally illustrated. Arrows 68 indicate respectively the movability of the movable car body part 28, 56, 58 and 64.

Figure 29:
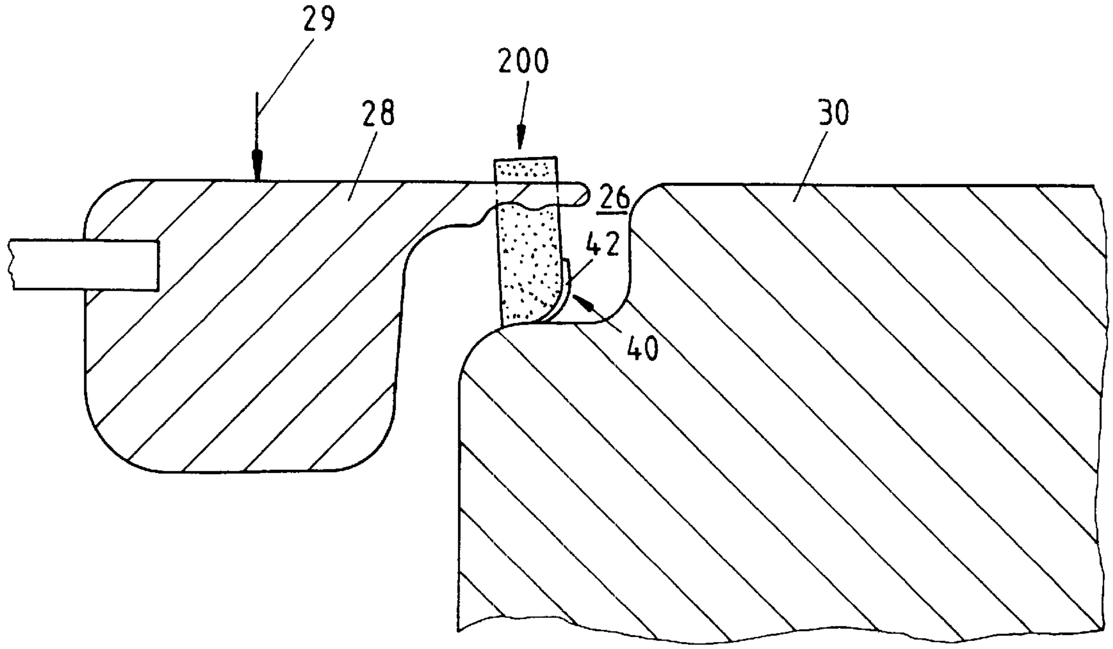
FIGS. 29 to 33 show further examples of an arrangement of plastic profiles according to FIG. 1 in a gap.
Figure 30:
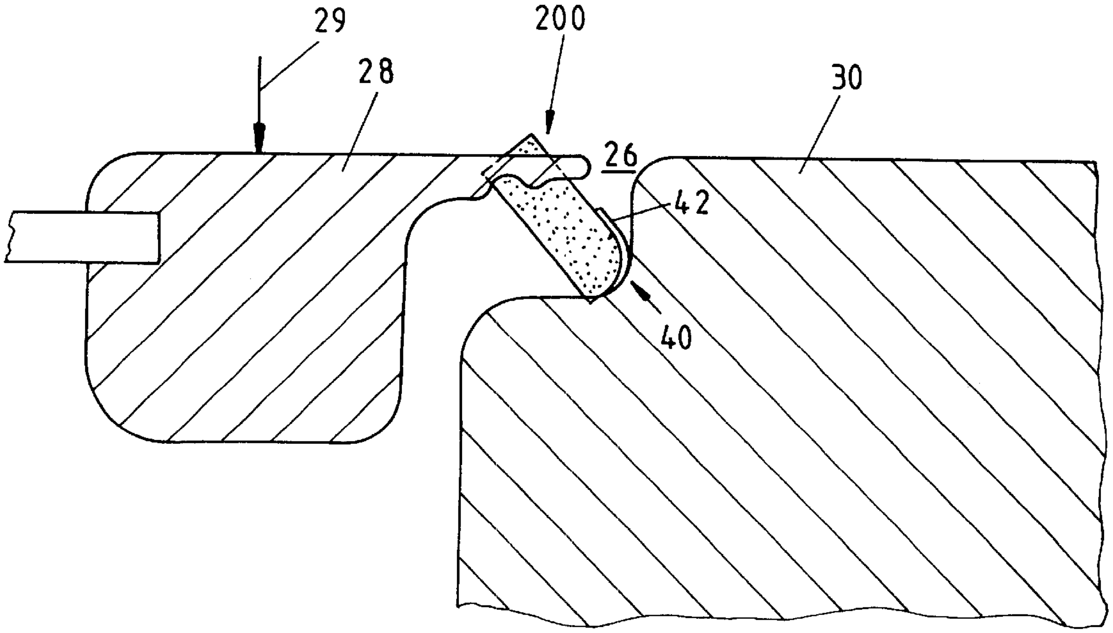
Figure 31:
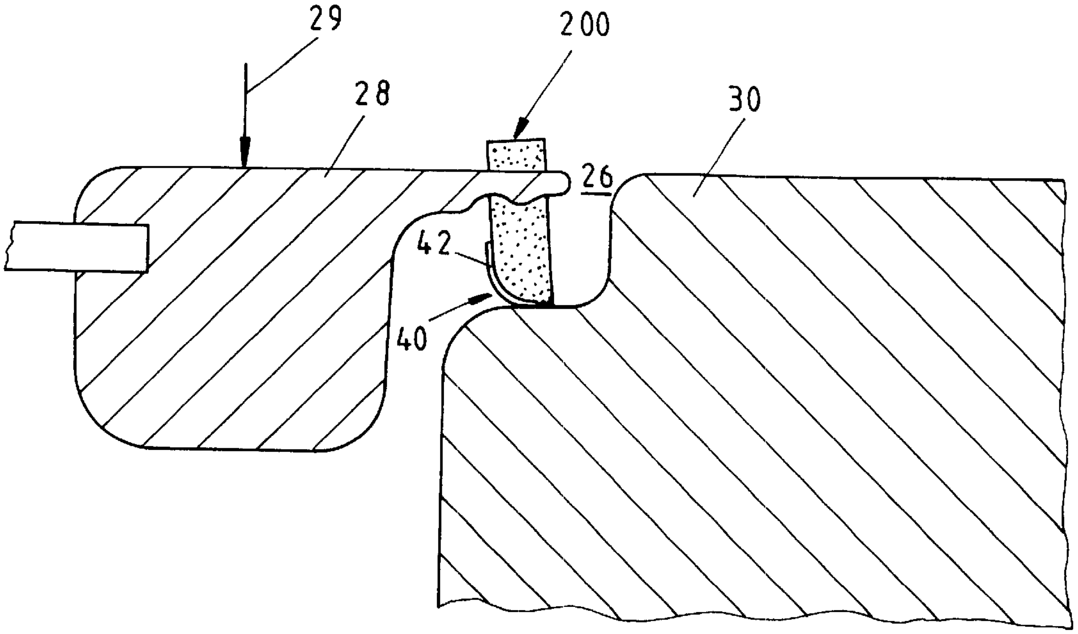
Figure 32:
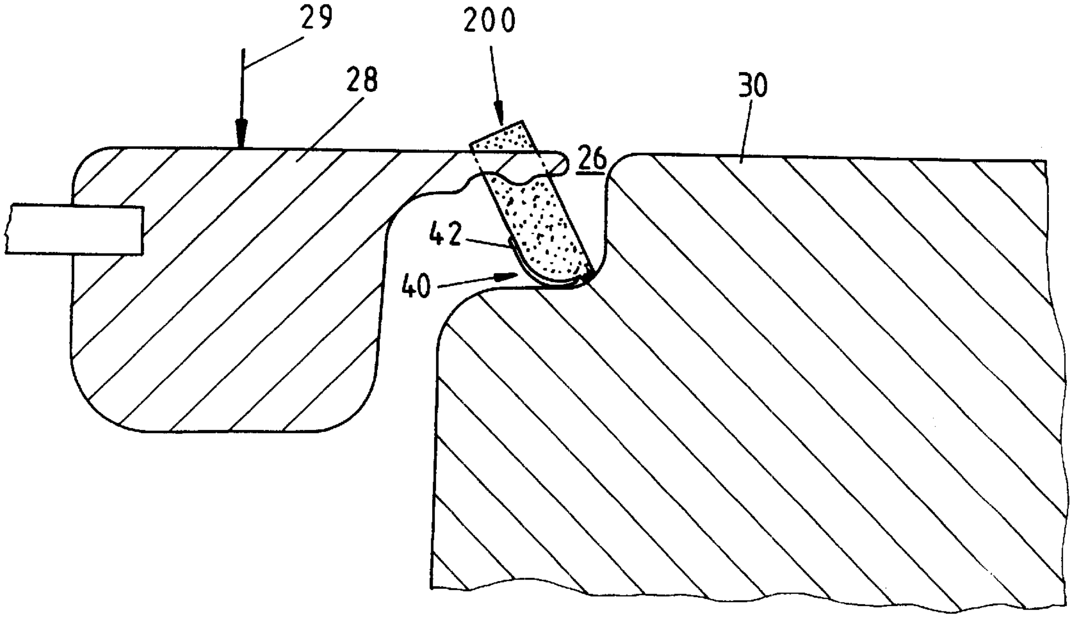
Figure 33:
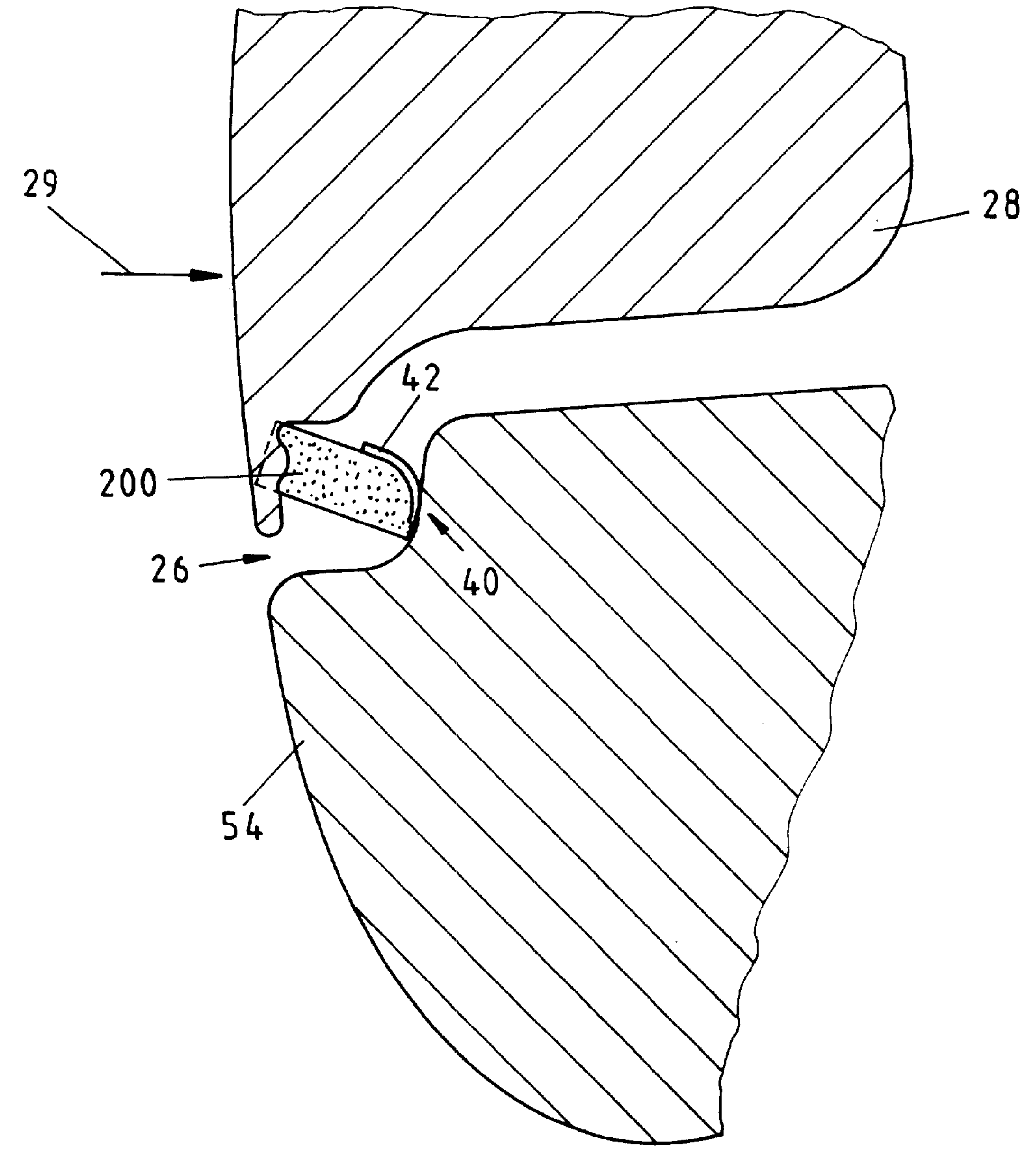

Further fitting examples for the plastic profile 200 in a gap 26 between a rear door 28 and a fixed car body part 30 result from FIGS. 29 to 33. The door 28 is a rear door and in FIG. 33 a front door 28 which has been closed in direction of the arrow 29. FIGS. 29 and 31 show a fitting with a steep fitting angle and FIGS. 30 and 32 with a flatter fitting angle, the rounded edge 40 being adjusted once in direction of the gap 26 and once in direction of the gap inner space. FIG. 33 shows a fitting example with a fitting angle which is situated between the fitting angles of the above mentioned FIG. 30.

FIGS. 25 to 40 show a further embodiment of a plastic profile 300 which also shows a substantially rectangular cross section with two long sides 10,12 and with two short sides 14, 15. The short side 15 has a semicircular cross section (FIG. 35). Accordingly only one of the two short sides 14, 15 of the plastic profile 300 is configured semicircular, the center of the circle radius for the semicircular section being on the central longitudinal axis ML of the plastic profile. For the embodiment represented in FIG. 34, the plastic profile shows a semicircular section in a short side 15, whereby it is also possible to displace the center MP for the radius of the half circle in direction of the arrow X or X1 so that the short side 15 shows a bow-shaped course between the sides 10 and 12.

Figure 34:
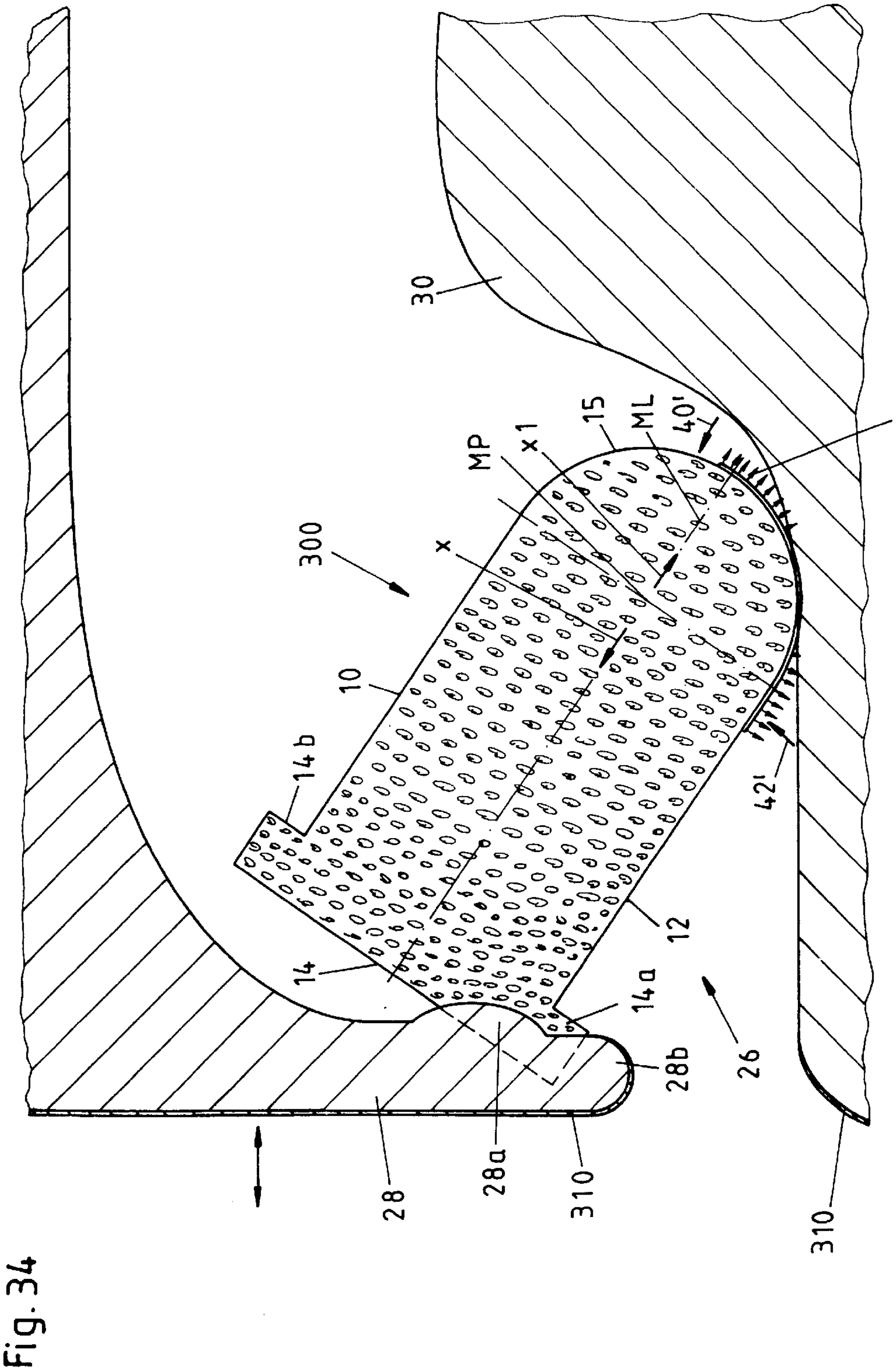
FIG. 34 shows a sectional view of a further embodiment of a T-shaped plastic profile with a rectangular cross section and with a semicircular profile showing an adhesive coating in the area of the short profile side.
Figure 35:
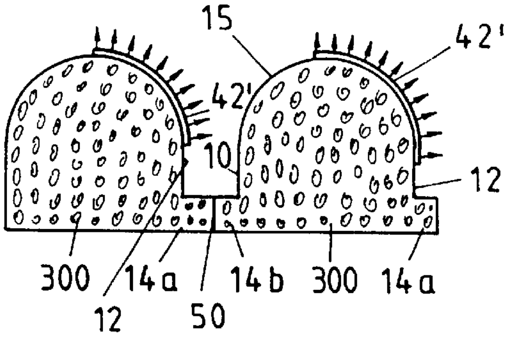
FIG. 35 shows a sectional view of an arrangement of two connected plastic profiles with short length according to FIG. 34 which are connected with each other over a tear-off edge.
Figure 36:
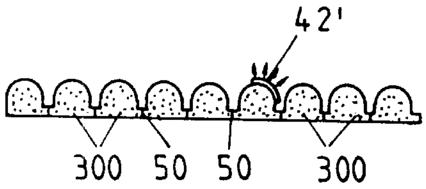
FIG. 36 shows a sectional view of a row arrangement of several plastic profiles according to FIG. 34, the plastic profiles being connected with each other over tear-off edges.

The plastic profile 300 according to FIG. 34 shows, like the plastic profile 200, an approximately rectangular cross section with longitudinal sides 10, 12 and with narrow sides 14, 15, the narrow side 15 being semicircular. This semicircular section 40' is provided with an adhesive coating 42' which however extends over half the semicircular section 40', as represented in FIG. 34. The adhesive coating 40' is provided for adjacent to the longitudinal side 12 of the profile. The other narrow side 14 constitutes a T-shaped area by constituting two lateral surface sections **14*a*, 14*b* which do not have dimensions for the embodiment according to FIG. 34, whereas the T-shaped area for the embodiment according to 41** extends over the biggest part of the whole profile.

An adhesive coating 42' made of a preferably redetachable adhesive substance is provided for on the outer wall surface of the semicircular bow-shaped section of the side 15 of the plastic profile 300, this adhesive coating extending however only over a partial section **40'*a* of the rounded edge or over the bow-shaped section 40'. This predetermined section 40'*a* with the adhesive coating 42' extends approximately from the middle of the whole rounded edge 40' and/or edge surface as far as into the not rounded area of the long side 12, as represented in FIG. 34**.

The side 14 of the plastic profile 300 which is not turned to the rounded side 15 is, for the embodiment shown in FIG. 34, provided with lateral enlargements **14*a*, 14*b* so that the plastic profile is configured with a T-shaped cross section. In the gap sealing state, an improved sealing bearing on the movable car body part 28, for example a door, and on the fixed car body part 30 is achieved with such a configured plastic profile 300 so that the gap 26 is completely sealed, an adhering of the plastic profile 300 to the fixed car body part 30 being achieved by means of the adhesive coating 42'. The position of the plastic profile 300 is thus secured between the two car body parts. Besides, the inner profiles 28*a* of the movable car body part 28 can be pressed into the material of the plastic profile 300, as shown in FIG. 34, whereby however a sufficient bearing of the side 14 with the lateral enlargements 14***a*, 14*b* of the plastic profile 300 on the movable car body part 28 is achieved, the sealing being then carried out by the profile enlargement 14*a* which thus represents a lateral enlargement of the plastic profile 300 so that it is also possible to carry out the enamel coating 310 as far as into the plastic profile area without enamel being applied as far as onto the plastic profile 300.

FIG. 34 shows the mounting of the plastic profile 300 between two car body parts 28, 30 and the comprehensive sealing of the gap 26 between the two car body parts.

Figure 37:
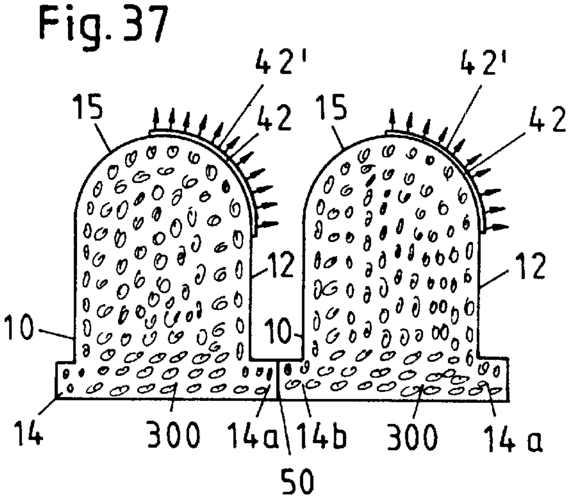
FIG. 37 shows a sectional view of an arrangement of two connected plastic profiles with a bigger length than the plastic profiles according to FIG. 35, the plastic profiles being connected with each other over tear-off edges.
Figure 38:
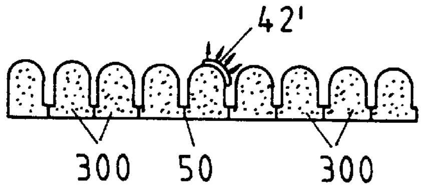
FIG. 38 shows a sectional view of a row arrangement of several plastic profiles according to FIG. 37, the plastic profiles being connected with each other over tear-off edges.
Figure 39:
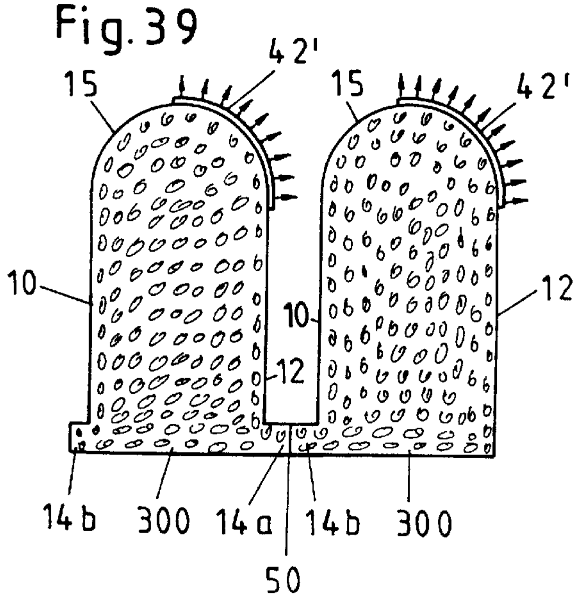
FIG. 39 shows a sectional view of an arrangement of two connected plastic profiles with a bigger length than the plastic profiles according to FIG. 37, the plastic profiles being connected with each other over tear-off edges.
Figure 40:
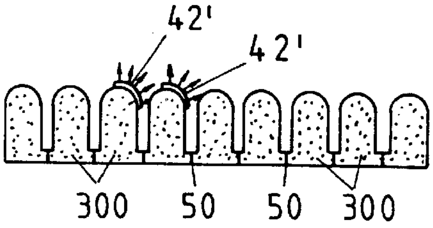
FIG. 40 shows a lateral view of a row arrangement of several plastic profiles according to FIG. 39, the plastic profiles being connected with each other over tear-off edges.

FIGS. 35 to 40 show different row arrangements of plastic profiles 300, whereby the FIGS. 35, 37 and 39 show respectively two plastic profiles 300 connected with each other over a tear-off edge 50 in different sizes, whereby plastic profiles with an enlargement 14*a* or 14*b* configured on one side can also be used, as shown in FIG. 35. The row arrangements of plastic profiles 300 represented in the FIGS. 36, 38, 40 correspond to the plastic profiles represented in the FIGS. 35, 37 and 39. All the represented plastic profiles 300 show on one side a semicircular profile configuration, the adhesive coating 42' being provided approximately on half the length of the outer perimeter of the half-circle profile. The sprayed enamel can then settle around the car body partial roundings 28*b* without this car body partial rounding area being covered by sealing material (FIG. 34).

Figure 41:
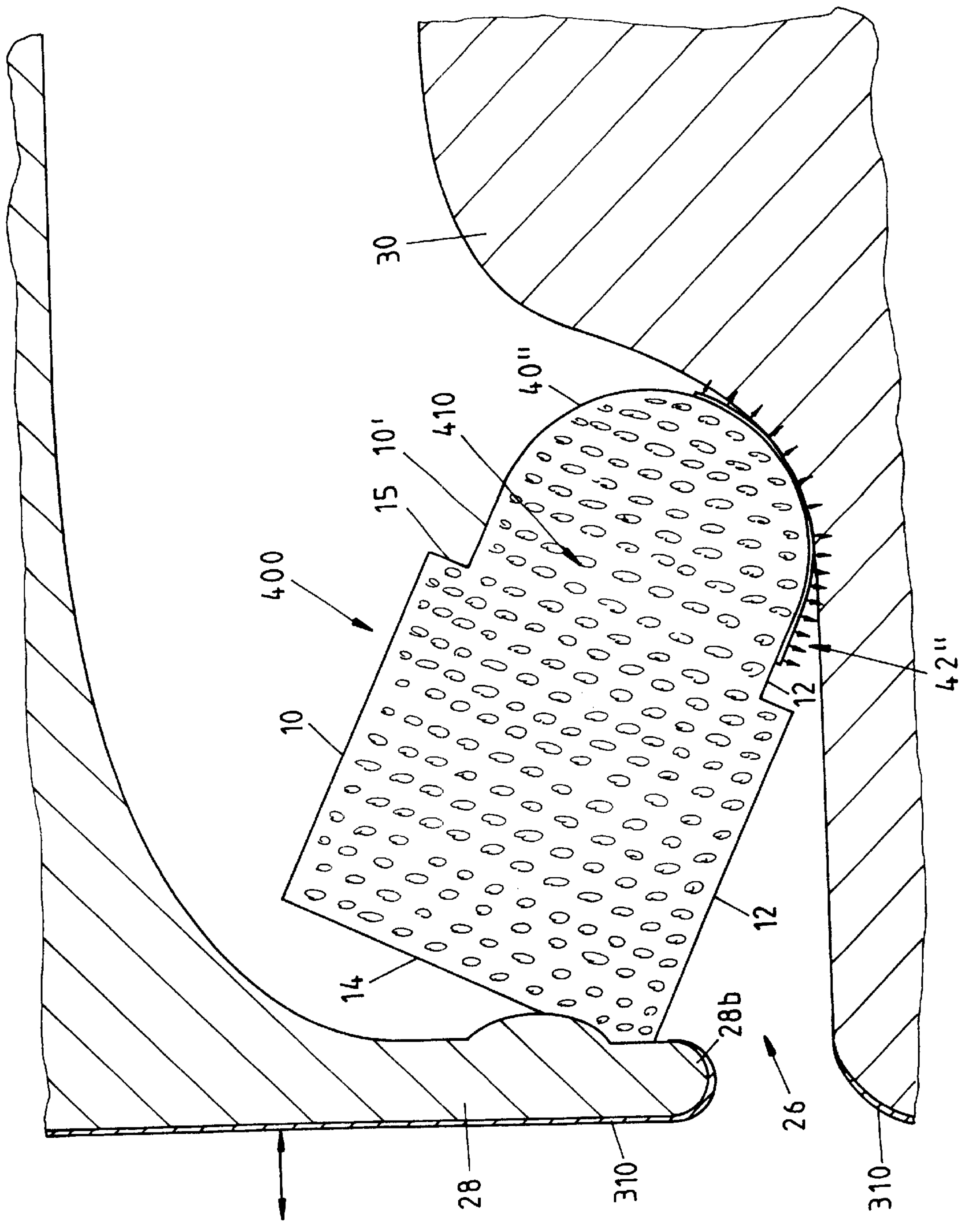
FIG. 41 shows a sectional view of another embodiment of a T-shaped plastic profile with a rectangular cross section and with a moulded neck-type reduced section with a semicircular profile showing an adhesive coating in the area of the shorter profile side.

FIGS. 41 to 45 show a further embodiment of a plastic profile 400. The plastic profile 400 consists of an approximately square cross section with the sides 10, 12 running in profile longitudinal direction and the sides 14, 15 running transversely to the profile longitudinal direction. In one of the two sides 14, 15, according to FIG. 41, a neck-type reduced section 410 is moulded on the side 15, section which shows a circular arc-shaped profile, preferably a semicircular profile or a rounded edge 40". This circular arc profile 40" can directly change into the side 15 of the cross section profile of the plastic profile 400. However it is also possible to let change the circular arc profile 40" into lateral sections 10', 12' running in the longitudinal direction of the plastic profile 400. An adhesive coating 42" is applied in the area of the circular arc profile 40", coating which approximately extends over half the length of the perimeter of the circular arc profile 40", as represented in FIG. 41. The adhesive coating 42" preferably extends as far as into the area of the lateral section 12' so that a comprehensive sealing of the gap 26 between two car body parts 28, 30 is guaranteed. Also by using this plastic profile 400, a gap sealing is achieved in the way that the outer wall surface of the nose-shaped element 28*b* of the car body part 28 is not covered by the plastic profile 400 so that, when enamelling, the enamel can be applied on the wall surface around this bulging as far as into the area of the gap sealing plastic profile without unpleasant fins or edges being able to develop in the end area of the applied enamel, when the plastic profile is removed from the gap.

Figure 42:
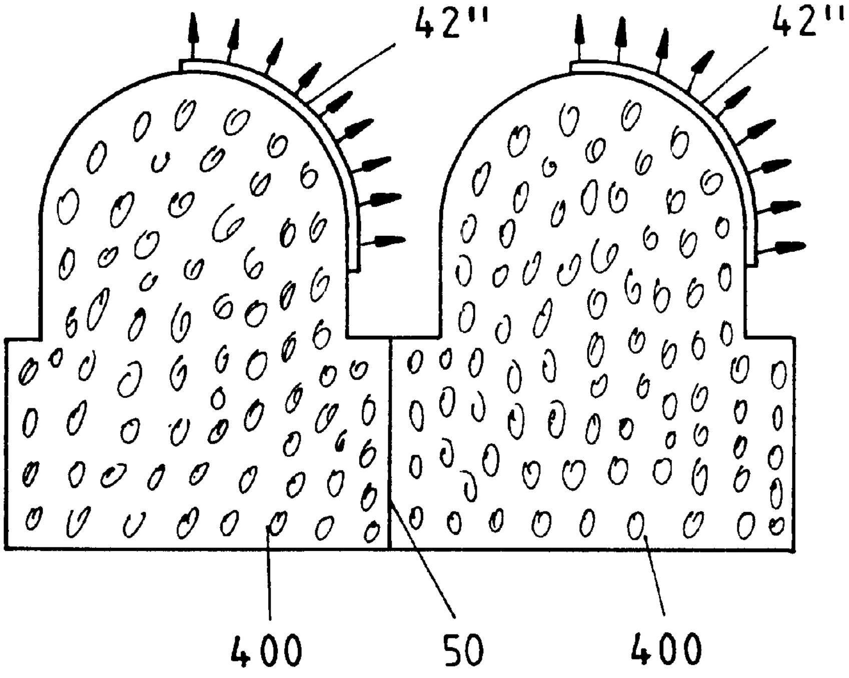
FIG. 42 shows a sectional view of an arrangement of two connected plastic profiles according to FIG. 41 which are connected with each other over a tear-off edge.
Figure 43:
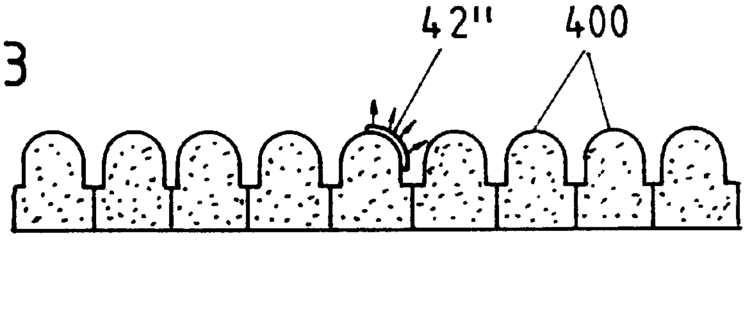
FIG. 43 shows a sectional view of a row arrangement of several plastic profiles according to FIG. 41, the individual plastic profiles being connected with each other over tear-off edges.
Figure 44:
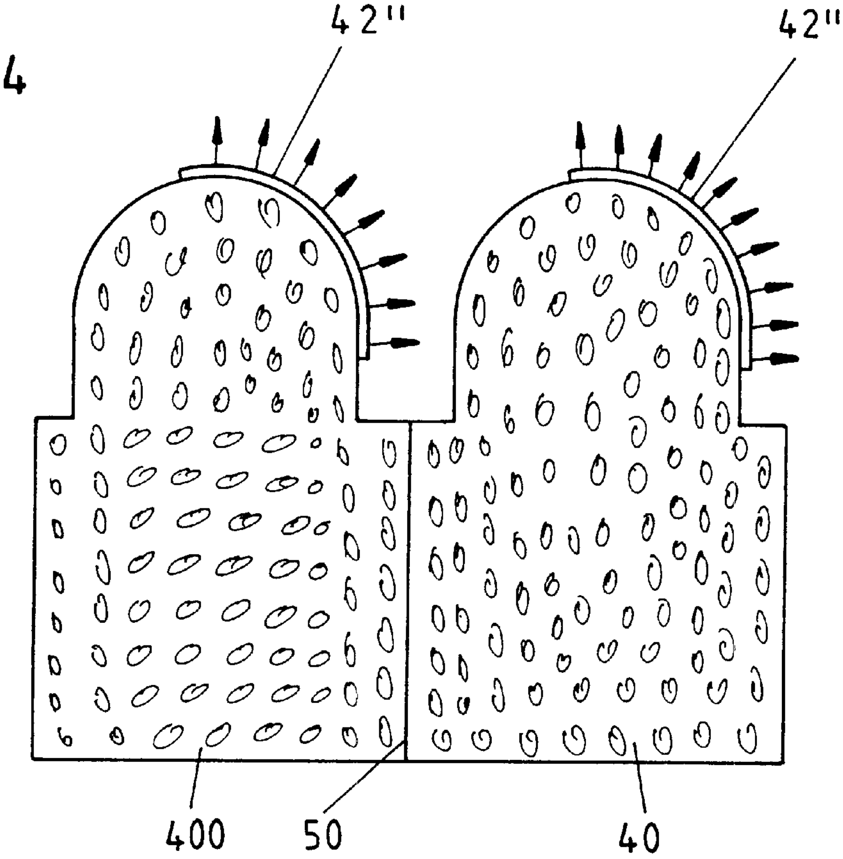
FIG. 44 shows a sectional view of an arrangement of two connected plastic profiles with a bigger length than the plastic profiles according to FIG. 42, the plastic profiles being connected with each other over tear-off edges.
Figure 45:
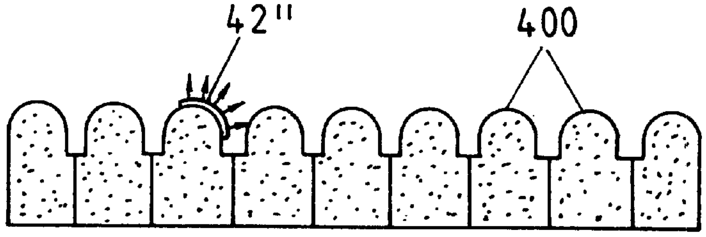
FIG. 45 shows a sectional representation of a row arrangement of several plastic profiles according to FIG. 44 which are connected with each other over tear-off edges.
Figure 46:
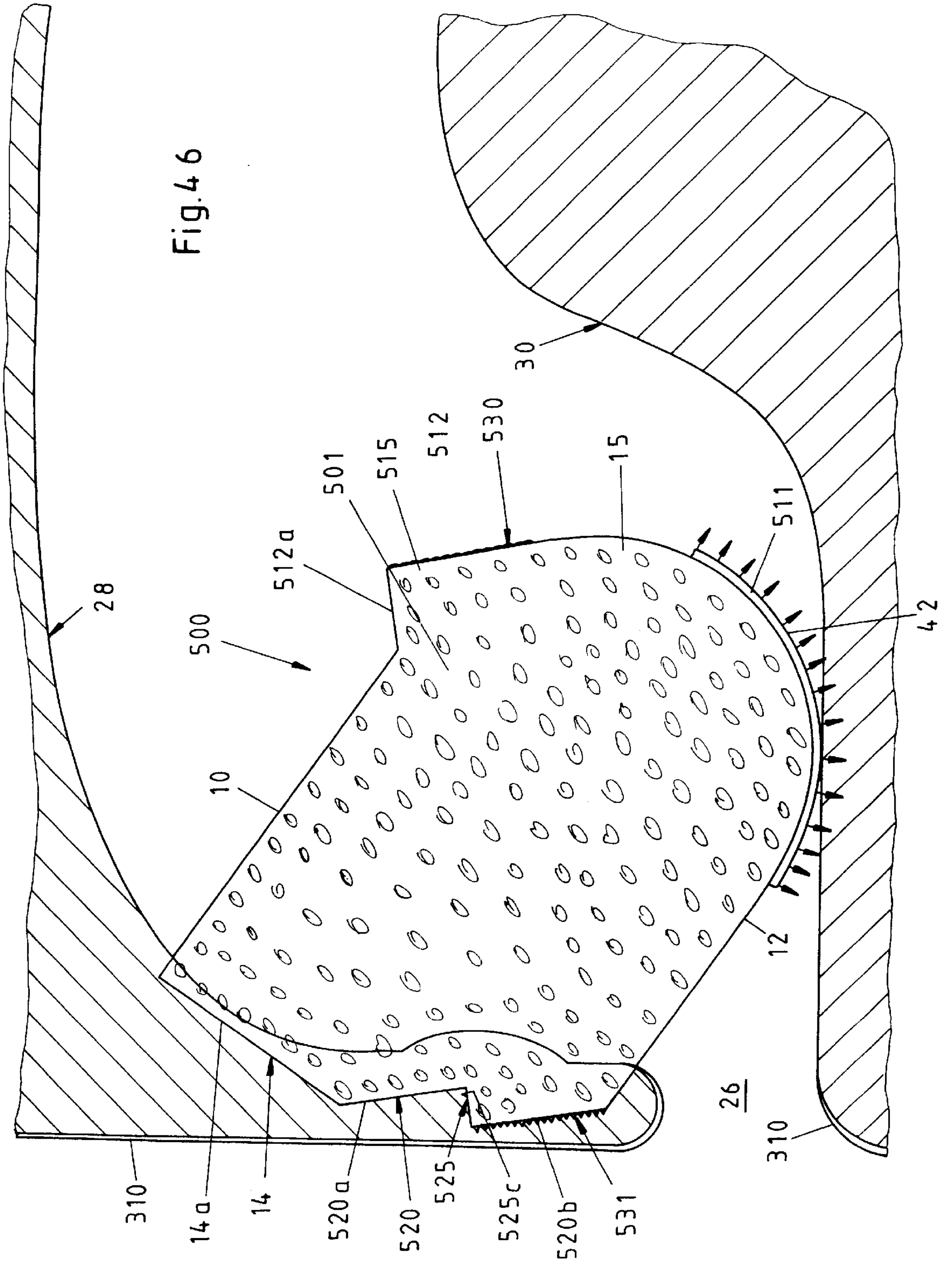
FIG. 46 shows a vertical cross section through a further embodiment of a plastic profile placed between a movable and a fixed car body part with a step-shaped section running obliquely and configured on one end side.
Figure 47:
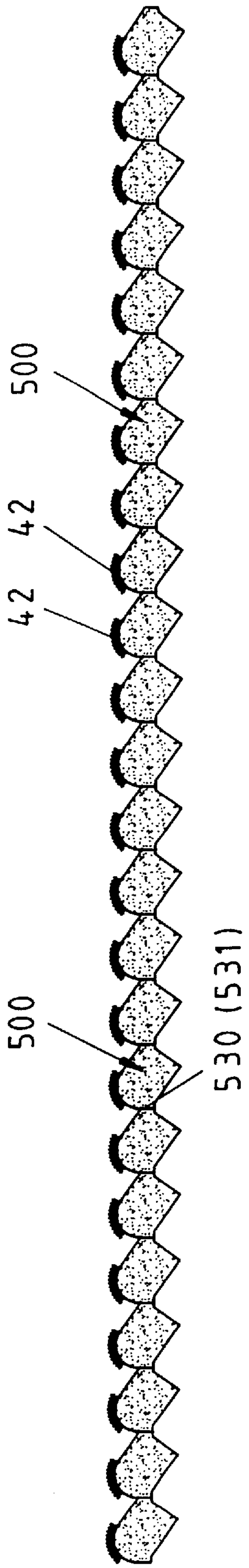
FIGS. 47 and 48 show row arrangements of several plastic profiles connected with each other over tear-off edges according to FIG. 46, however with different cross section profile lengths.
Figure 48:
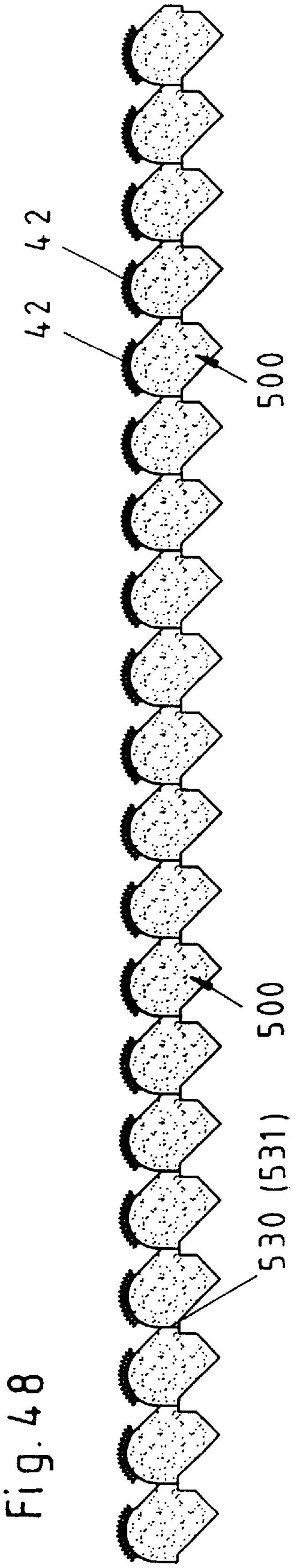

FIGS. 42 to 45 show the arrangement of two plastic profiles 400 (FIGS. 42, 44) which are connected with each other over tear-off edges (nominal breaking lines) 50, while FIGS. 43 and 45 show several plastic profiles 400 combined in a row which are also connected with each other over tear-off edges 50. The plastic profiles 400 according to FIGS. 42 and 43 show an approximately square cross section with a moulded neck-type reduced section 410. For the plastic profile 400 according to FIGS. 44 and 45, the start is an approximately rectangular cross section on which the neck-type reduced section 410 is moulded.

The plastic profiles 300, 400 represented in FIGS. 34 to 45 and described above can be produced at low cost, particularly since only a milling shape roll is required for the production. The further cutting off of a plastic profile strip from the remaining plastic profiles is then carried out with a perforated roller cutter. The tear-off edges or the nominal breaking points 50 are then always preferably provided for between two plastic profile strips, if a cutting off of individual plastic strips has to be carried out manually on the spot.

Pratical tests with the plastic profile 200, 300 have proved that probably because of damming up of air in the gap 26 in a space or a hollow space cut off from the plastic profile 200, 300, substantially no enamel or paint enters so that an edge formation due to settlement and accumulation of enamel or paint is efficiently avoided.

In order to place a plastic profile 200, 300, 400 according to the invention in a gap to be sealed between a movable and a fixed car body part of a vehicle, the procedure is as follows:

(a) Fixing of the plastic profile in a gap area by means of the adhesive means on the fixed car body part, the movable car body part being in an opened state, (b) Closing of the movable car body part, (c) Pressing in of the plastic profile into the gap to be sealed by compressing it and (d) Further pressing in of the plastic profile into the gap to be sealed in such a manner that the bow-shaped configured side of the plastic profile is set back by a predetermined length into the gap to be sealed.

A further arrangement consists in that the rounded area of the plastic profile is placed on the fixed car body part in such a way that a contact point of the rounded corner with the fixed car body part is spaced from the gap by a length L, the length L being bigger than the width of the gap, the length L being selected so that a hollow space between the gap and the plastic profile is four times as big as the gap itself.

FIGS. 46 to 50 show a further embodiment of a plastic profile 500 as a sealing strip for a gap between two car body parts, for example a fixed car body part 30 and a movable car body part 28 of a passenger car, the plastic profile 500 being placed in the gap 26 between the two car body parts 28, 30 (FIG. 1). 310 designates an enamel layer.

The plastic profile 500 consists in a profile 501 with a rectangular cross section with longitudinal sides 10, 12 running parallel to each other and with narrow sides 14, 15 running transversely to the profile longitudinal direction. Among the two narrow sides 14, 15, the narrow side 15 is rounded. This rounded section 511 changes on the one hand into the longitudinal side 12 of the profil 501 and on the other hand into a linearly running section 512. This section 512 runs obliquely to the narrow side 14 and is prolongated over the longitudinal side 10 of the profile 501 by constituting an approximately rectangular surface section 515 and changes into this with a section 512*a* which runs obliquely to the narrow side 14 so that the triangular surface section 515 is constituted by the sides 512, 512*a*.

The rounded section 511 of the profile 501 is provided with an adhesive coating 42 (FIG. 1).

The narrow side 14 of the profile 501 opposite the bow-shaped section 511 changes to a section 520 into the longitudinal side 12 of the profile 501, section which is obliquely running in direction of the bow-shaped section 511 by constituting a step 525. Approximately half the length of the narrow side 14 of the profile 501 is configured as obliquely running section 520 which shows the step 525.

The obliquely running section 520 with the step 525 of the narrow side 14 consists of two sections 520*a*, 520*b* which are offset relatively to each other, sections which are connected by a section 520*c* which is at right angles to the sections 520*a*, 520*b*.

Figure 49:
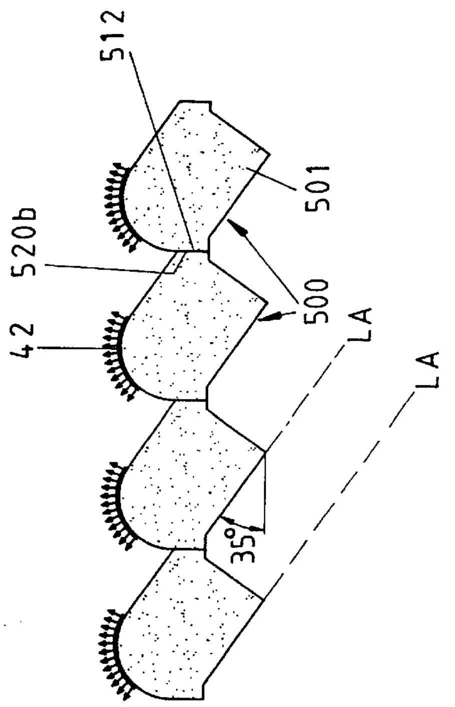
FIG. 49 shows a row arrangement of several plastic profiles connected with each other over tear-off edges in vertical cross sections with a small step configuration in the tear-off edge areas.

According to a first embodiment according to FIG. 49, the section 520*b* of the step 525 of the narrow side 14, section 520*b* which runs adjacent obliquely to the longitudinal side 12 of the profile 501, shows a shorter length than the section 520*a* running adjacent obliquely to the section 14*a* of the narrow side 14, section 14*a* which runs transversely to the profile longitudinal direction. According to FIG. 50, both obliquely running sections 520*a*, 520*b* of the step 525 of the narrow side 14 of the profile 501 show the same length. Other length dimensions of the sections 520*a*, 520*b* of the step 525 are also possible.

Figure 50:
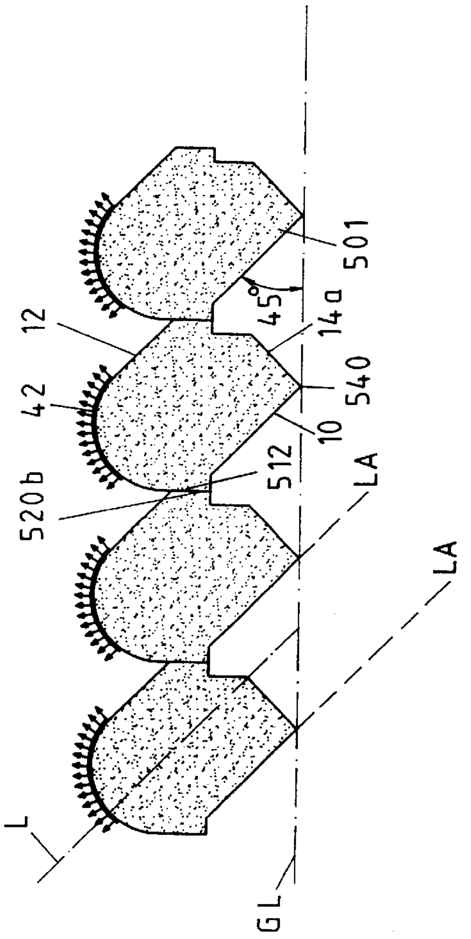
FIG. 50 shows a row arrangement several plastic profiles connected with each other over tear-off edges in vertical cross sections with a big step configuration in the tear-off edge areas.

As FIGS. 42 to 50 show, several plastic profiles 500 arranged in a row are connected with each other over tear-off edges 530, 531, as it is also the case for the plastic profiles 200, 300, 400. The plastic profiles 500 according to FIGS. 41 and 50 are arranged in a row and connected with each other so that both lateral sections 512, 520*b* of the profile 501 which run parallel to each other and which show for example the same length constitute the tear-off edges 530, 531 so that the plastic profiles 500 connected with each other over their lateral sections 512, 520*b* have, with reference to their longitudinal axes LA, an angular position of 35° to 45° to the horizontal basis line GL which is constituted by the corner areas in which the longitudinal sides 10 of the profiles 501 are brought together with their lateral sections 14*a* (FIG. 50).

Figure 51:
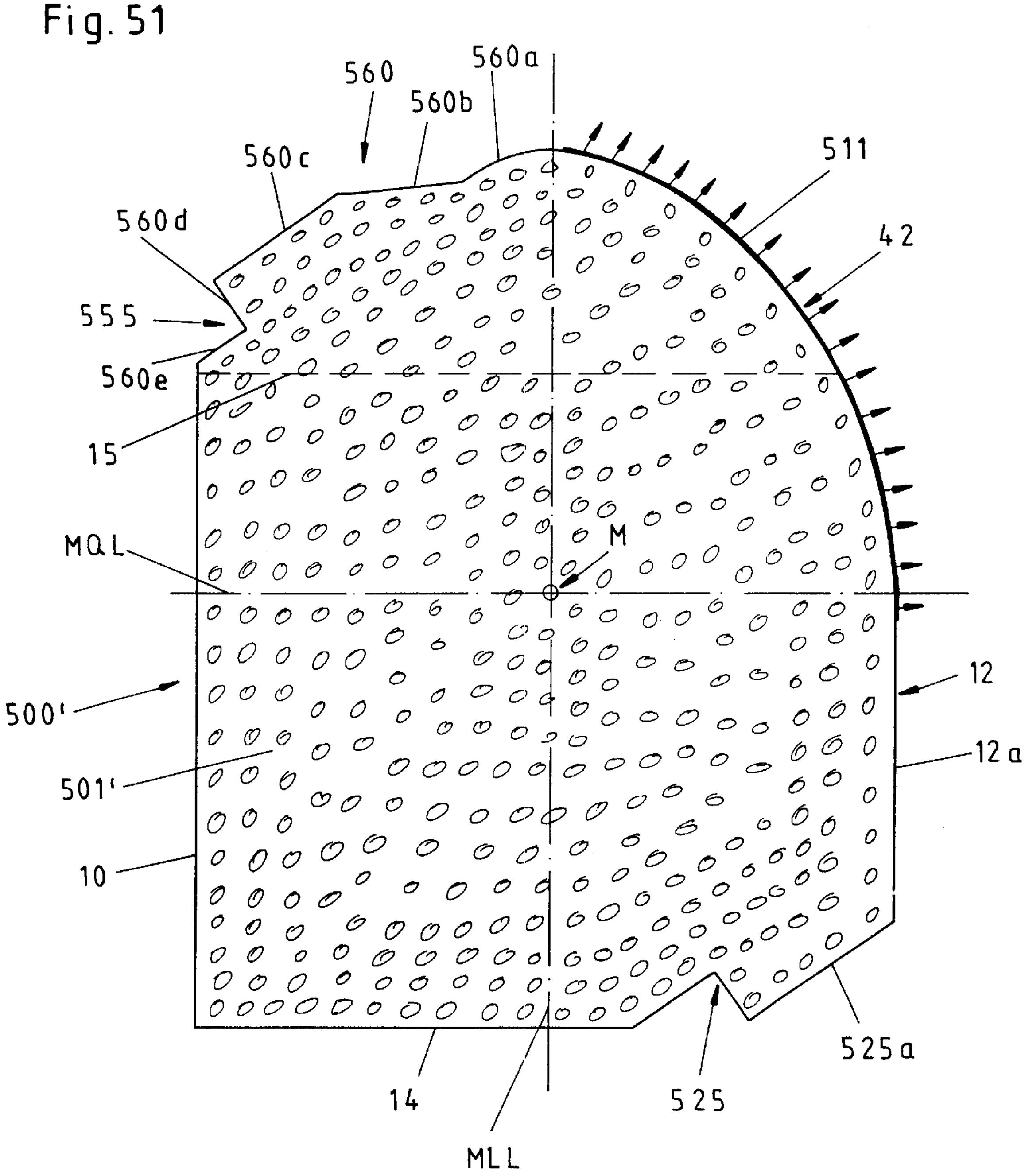
FIG. 51 shows in an enlarged cross section a further embodiment of a plastic profile with step-shaped tapers configured in both narrow side areas.
Figure 52:
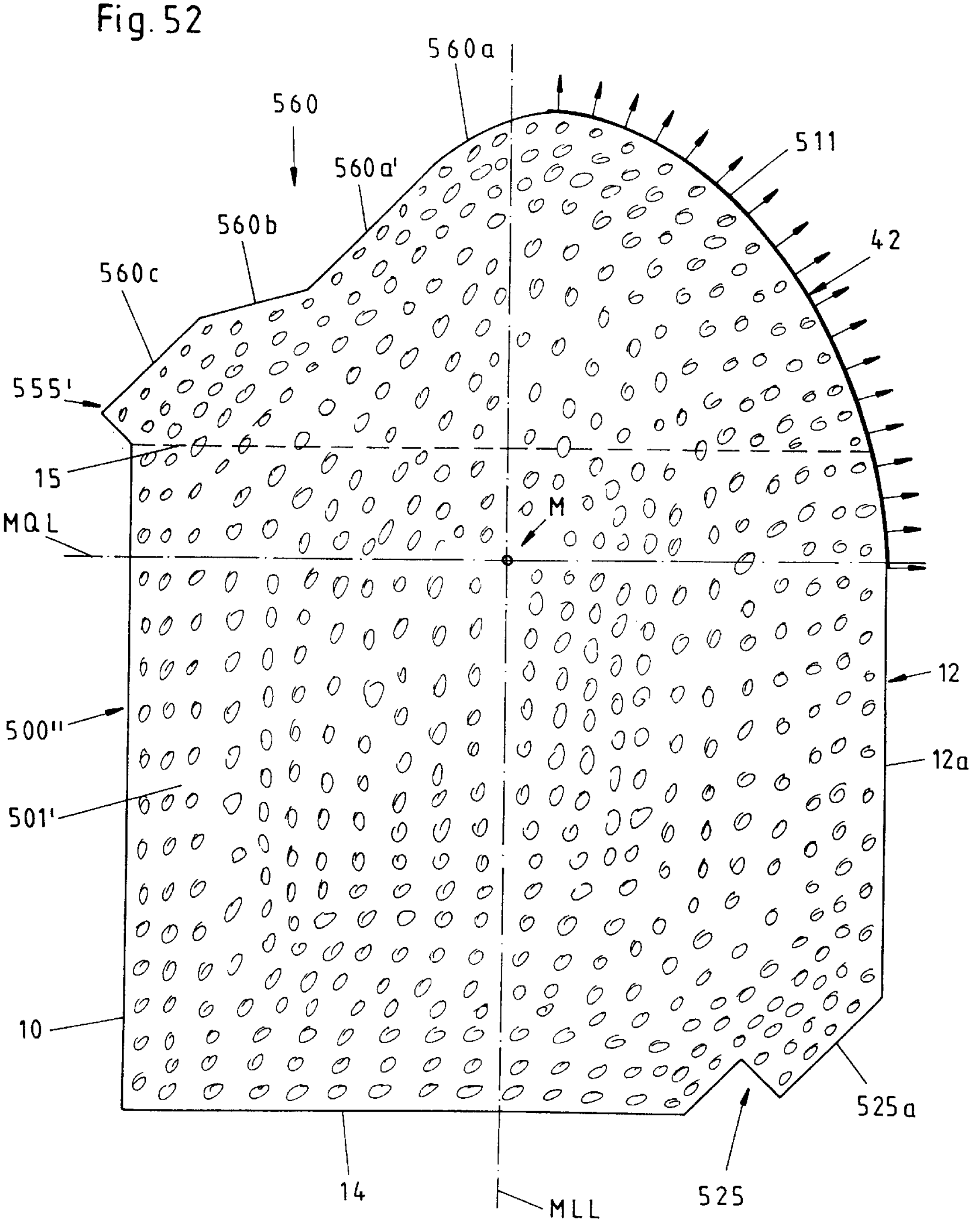
FIG. 52 shows in an enlarged cross section a further embodiment of an approximately rectangular plastic profile with step-shaped tapers configured in one of the two narrow side areas and with a step-shaped configuration configured in the other narrow side area.

For the plastic profiles 500', 500" represented in FIGS. 51 and 52 also, the start is an approximately rectangular cross section profile 501', the approximately parallel running longitudinal sides of which are indicated by 10, 12 and their narrow sides by 14, 15, the narrow side 15 being only drafted in order to obtain a reference line for the head side configuration. The center of the profile 501' is indicated by M, the center longitudinal line by MLL and the center transversal line by MQL. The profile narrow side 14 changes by constituting a reduced step 525 over an obliquely rising section 525*a* into the longitudinal side 12, the linearly running section 12*a* of which changes into a circular bow-shaped section 511 which supports the adhesive means layer 42, the taper constituted by the step-shaped section 525 being approximately triangular.

The section 560 which follows the circular bow-shaped section 511 of the profile 501' and which changes into the longitudinal side 10 shows a specifically configured profile, as represented in FIGS. 51 and 52. A partially circular section 560*a* which changes to a linearly or slightly obliquely running section 560*b* follows the circular arc section 511 which shows the adhesive coating 42. This section 560*b* is followed by a section 560'*c* which runs in direction of the profile narrow side 10 and which changes into the narrow side 10 by constituting a reduced step 555. This step 555 is constituted by two sections 560*d* and 560*e*. In this case also, the taper formed by the step-shaped configuration constitutes an approximately triangular surface. The configuration and the structure of the plastic profile 500" according to FIG. 52 corresponds approximately to that of FIG. 51, however with the difference that the narrow side 15 shows a different profile configuration. The partially circular section 560*a* changes into a section 560*a'* which runs strongly obliquely to the longitudinal side 10, section 560*a'* which is followed by the slightly inclined section 560*b* which changes into the section 560*c* running strongly obliquely or inclined to the narrow side 10, section 560*c* which however projects over the prolongated narrow side 10 and which changes into the narrow side 10 by constituting a step-shaped section 555', the step-shaped section 555' constituting a bulge with a triangular surface. The plastic profile 500' shows thus step-shaped tapers 525, 555 in its both narrow side areas 14, 15 and the plastic profile 500"*a* step-shaped taper 525 in the narrow side area 14 and a step-shaped bulge 555' in the other narrow side area 15 (FIGS. 51, 52, 56, 57).

Figure 53:
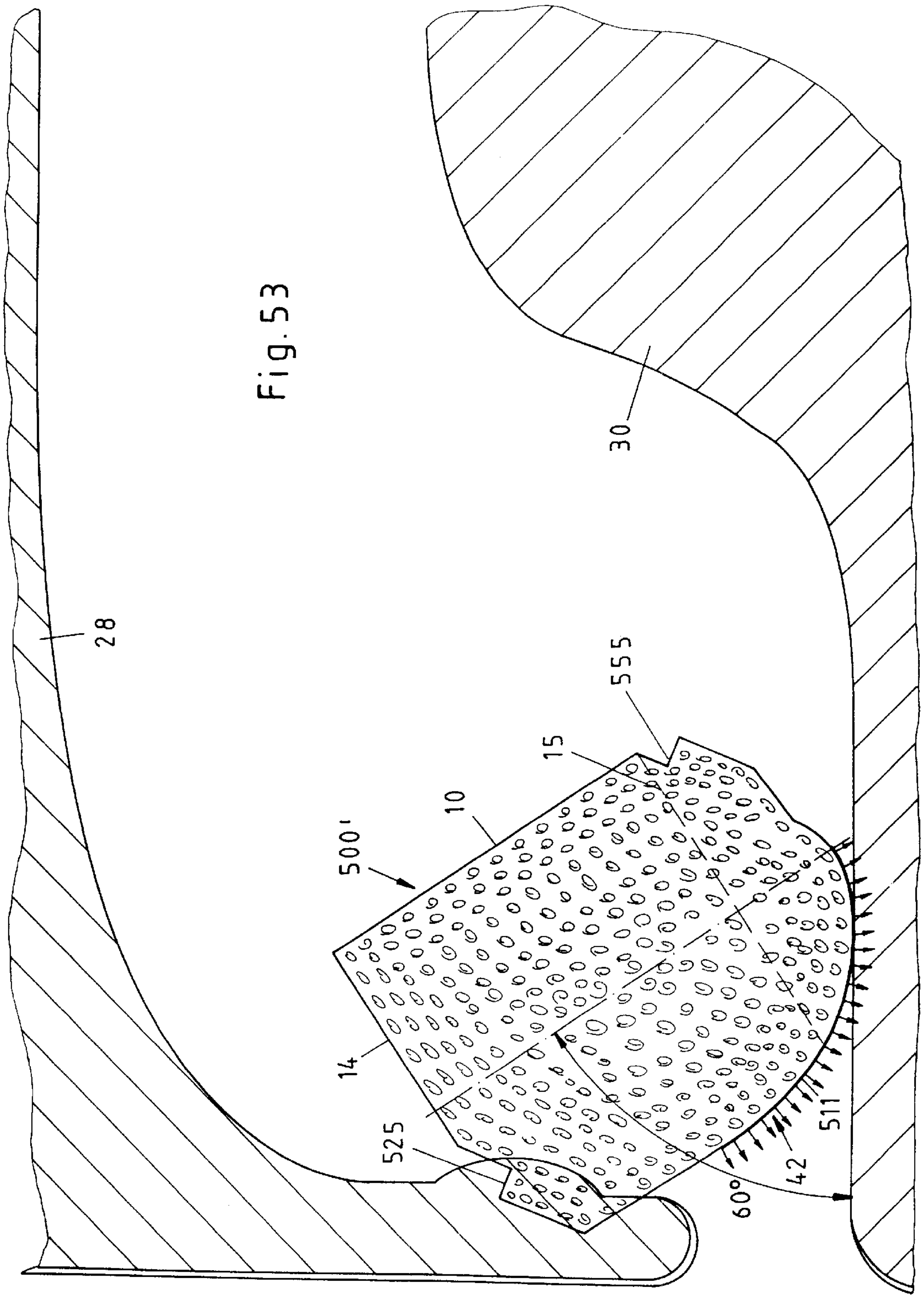
FIG. 53 shows the fitting of the plastic profile according to FIG. 51 in the gap between two car body parts, the plastic profile being fitted in the gap between the two car body parts in oblique position or in diagonal position to the car body parts which are approximately at a right angle to each other.
Figure 54:
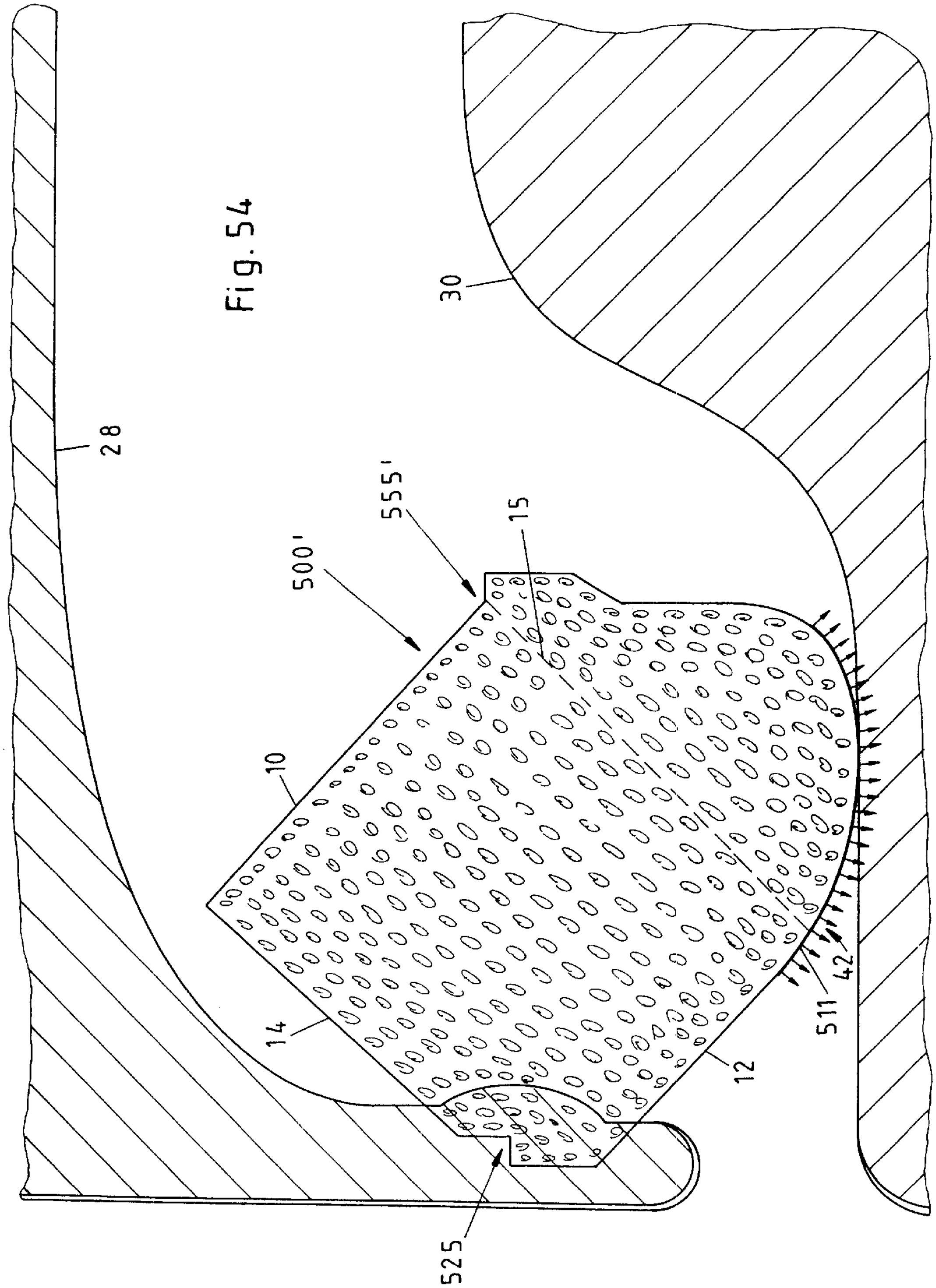
FIG. 54 shows the fitting of the plastic profile according to FIG. 52 in the gap between two car body parts, the plastic profile being fitted in the gap between the two car body parts in oblique position or in diagonal position to the car body parts which are approximately at a right angle to each other.

FIG. 53 shows the arrangement of the plastic profile 500' in the gap between two car body parts 28, 30, the nonskid fixing of the plastic profile being carried out by means of the adhesive means layer 42 on the inner wall surface of the car body part 30, the plastic profile 500' taking a position in an angle of approximately 50° to 60°; the angle dimension depends respectively from the position of the two car body parts 28, 30 to each other.

Figure 55:
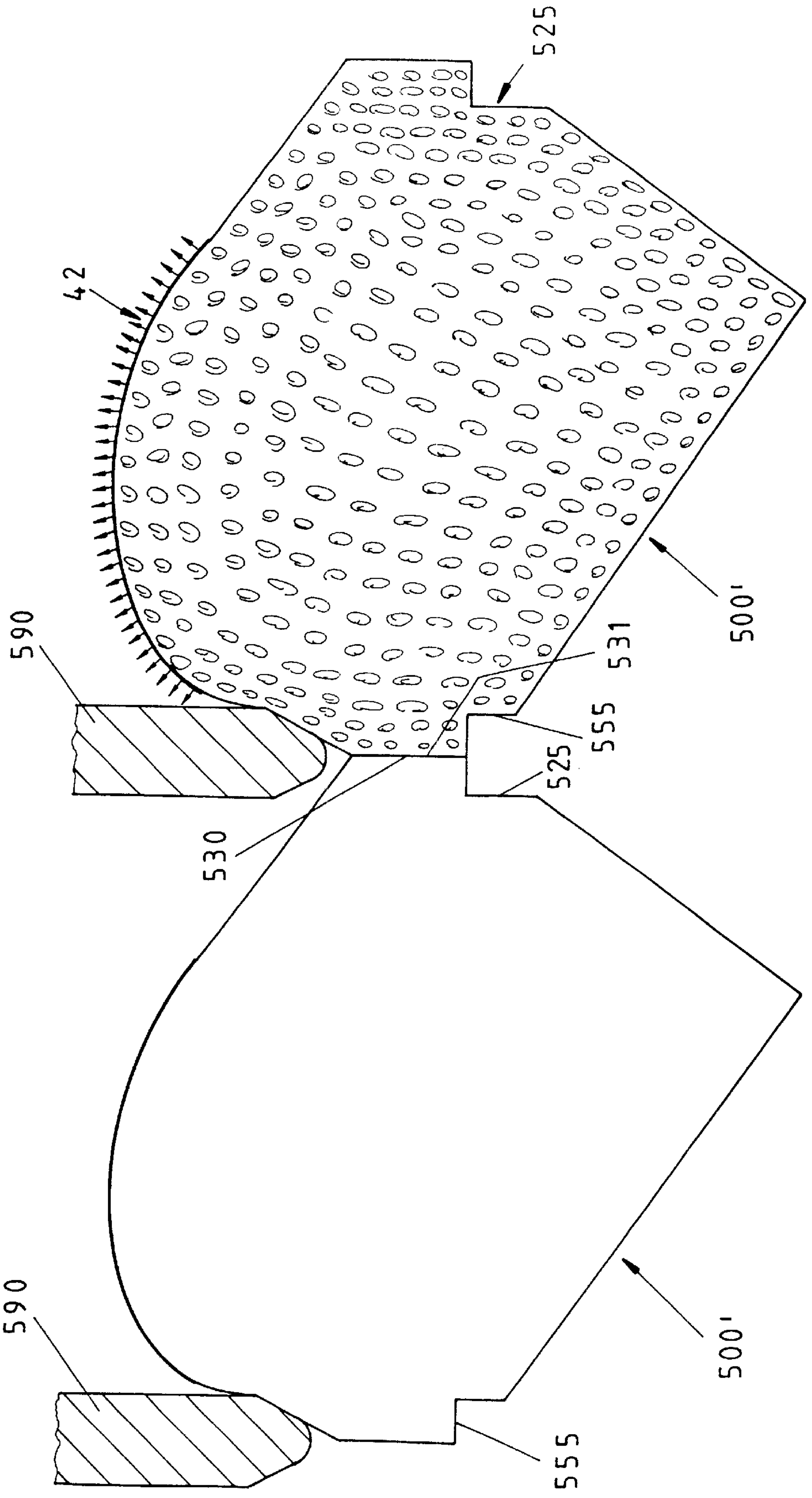
FIG. 55 shows two plastic profiles placed in a row connected with each other with step-shaped tapers configured in the narrow side areas according to FIG. 51 with a drafted crush cutter in the junction area of the two plastic profiles.
Figure 57:
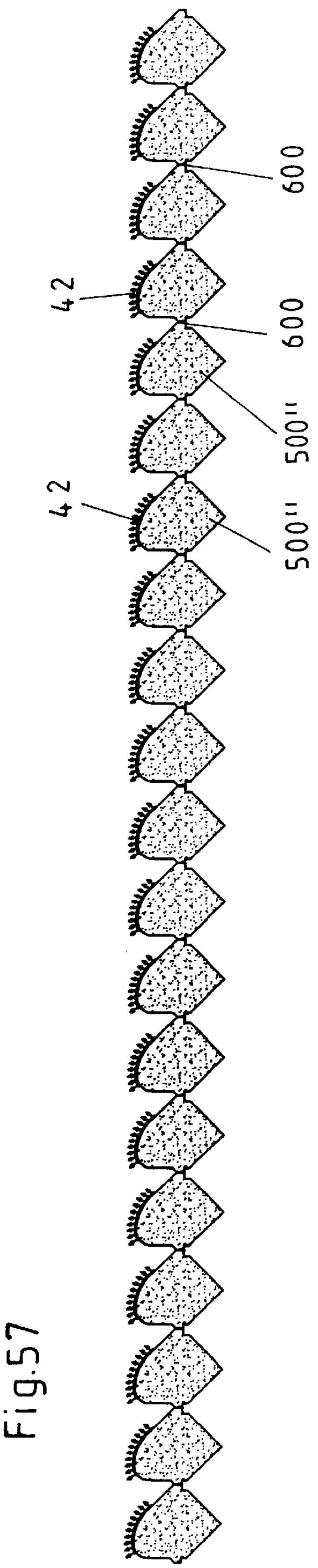
FIG. 57 shows a row arrangement of several plastic profiles connected with each other over tear-off edges in vertical cross sections with step-shaped tapers and bulges configured in the narrow side areas.

The production of the plastic profiles 500', 500" results from the row arrangement of several plastic profiles 500' (55, 56) and several plastic profiles 500" (FIG. 57). Respectively two plastic profiles 500' or 500" are connected with each other over perforations, i.e. over tear-off edges 530, 531. For the production of plastic profiles in row arrangement, a perforated cut is made by means of a crush cutter 590. The applying of the adhesive substance is made then after this perforated cut (FIG. 55).

Figure 56:
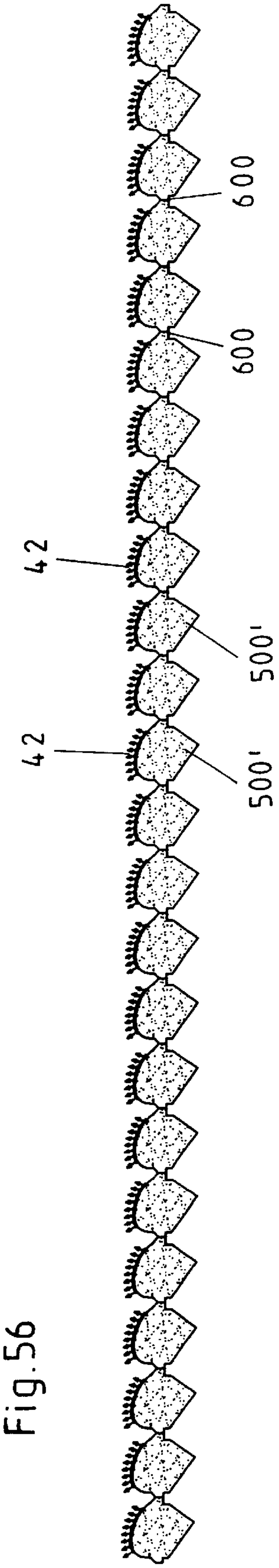
FIG. 56 shows a row arrangement of several plastic profiles connected with each other over tear-off edges in vertical cross sections with step-shaped tapers configured in the narrow side areas.

FIGS. 56 and 57 show plastic profiles 500', 500' placed in rows. The tear-off edges are indicated by 600.

What is claimed is:

1. A plastic profile for the gap sealing of two car body parts (28, 30) of vehicles, especially for repair enameling work on vehicles, with an adhesive agent (42) for the removable attachment of the strip-shaped plastic profile (200; 300; 400; 500; 500'; 500") to the surface, wherein the plastic profile (200; 300; 400; 500; 500'; 500") is configured as a flat profile with a rectangular or a square cross section, whereby one corner area (40) of one of the two sides (14, 15) of the plastic profile (200; 500) running transversely to the profile longitudinal direction has a rounded profile area, wherein an adhesive coating (42) is provided in the rounded profile area;

wherein a long side (10, 12) of the rectangular cross section of the plastic profile (200; 300) has a length of 15 mm to 25 mm, and a short side of the rectangular cross section has a length of 8 mm to 11 mm, wherein the plastic profile (200; 300) is connected with an adjacent identical plastic profile by a nominal breaking point (50) on a first one of the two sides of the rectangular cross section which is opposite the rounded corner and connected with another adjacent indentical plastic profile by an opposite nominal breaking point (48) on a second one of the two sides (15) of the rectangular cross-section, the one corner (40) of which is rounded.

2. A plastic profile according to claim 1, the plastic profile (200; 300) is provided with an adhesive coating (42) in the rounded profile area and on the profile outside.

3. A plastic profile according to claim 1, the plastic profile (200; 300; 400; 500) is made of an absorbent, especially of a porous material.

4. A plastic profile according to claim 1, the plastic profile (200; 300; 400; 500) is made of foam.

5. A plastic profile according to claim 1, the plastic profile (200; 300; 400; 500) is made of a material which resists to a surface treatment of the car body surface, in particular to enamelling.

6. A plastic profile according to claim 1, wherein the rounded corner (40) is configured as an arc of a circle.

7. A plastic profile according to claim 6, the arc of the circle has a radius of 7 mm to 10 mm.

8. A plastic profile according to claim 6, wherein the arc of the circle has a radius of 8.5 mm.

9. A plastic profile according to claim 6, wherein the arc of the circle has a radius of 8 mm.

10. A plastic profile according to claim 1, wherein the long side of the rectangular cross section of the plastic profile has a length of 20 mm to 24 mm, and the short side has a length of 9 mm.

11. A plastic profile for the gap sealing of two car body parts (28, 30) of vehicles, especially for repair enameling work on vehicles, with an adhesive agent (42) for the removable attachment of the strip-shaped plastic profile (200; 300; 400; 500; 500'; 500") to the surface, wherein the plastic profile (200; 300; 400; 500; 500'; 500") is configured as a flat profile with a rectangular or a square cross section, whereby at least one corner area (40) of one of the two sides (14, 15) of the plastic profile (200; 500) running transversely to the profile longitudinal direction has a rounded profile area, or one of the two sides (14, 15) of the plastic profile (300) running transversely to the profile longitudinal direction has a rounded profile area, or a neck-shaped reduced section is molded on one of the two sides (14, 15) of the plastic profile (400) running transversely to the profile longitudinal direction and has a rounded profile area, wherein an adhesive coating (42) is provided in the rounded profile area;

wherein the plastic profile (200; 300) shows lateral enlargements **(14*a*, 14*b*) on one side or on both sides on the side (14) of its cross section profile which is not provided with the rounded profile area (15)**.

12. A plastic profile according to claim 11, two corners of the rectangular cross section are rounded so that a short side (15) of the rectangular cross section is configured as a bow-shaped side (15).

13. A plastic profile according to claim 12, the plastic profile (200; 300) is configured compressible so that the bow-shaped side (15) in a mounting position for gap sealing is set back into a gap (26) by a predetermined length.

14. A plastic profile according to claim 12, wherein the bow-shaped side (15) is configured as a cylinder cup partial segment of a cylinder with a predetermined radius.

15. A plastic profile according to claim 12, wherein the bow-shaped side (15) is a ball cup partial segment of a ball with a predetermined radius.

16. A plastic profile according to claim 11, the plastic profile (300) is configured semicircular on one end side, the adhesive coating (42') extending approximately over half the length of the circular arc perimeter.

17. A plastic profile according to claim 11, the plastic profile (300) is configured bow-shaped on one end side, the bow-shaped section (40') extending from the one long side (10) to the other long side (12) of the cross section profile, the adhesive coating (42" being fixed approximately on half the length of the bow-shaped perimeter.

18. A plastic profile according to claim 11, wherein the adhesive coating (42) extends in the rounded profile area of the cross-section profile with a section as far as into the area of a long side (10; 12) of the cross section profile which is adjacent to the adhesive coating (42).

19. A plastic profile according to claim 11, wherein several plastic profiles are arranged in a row and connected with each other over tear-off edges.

20. A plastic profile according to claim 19, wherein several plastic profiles arranged in a row (500) are connected with each other over tear-off edges (530, 531), both lateral sections **(512, 520*b*) of a profile (501) running parallel to each other and showing the same length constituting the tear-off edges (530, 531) so that the plastic profiles (500) connected with each other over their lateral sections (512; 520*b*), have with reference to their longitudinal axes (LA), and angular position of 35° to 45° to the horizontal basis line (GL) which is constituted by the corner areas (540) in which the longitudinal sides (10) of the profiles (501) abroad together with their lateral sections (14*a*)**.

21. A plastic profile for the gap sealing of two car body parts (28, 30) of vehicles, especially for repair enameling work on vehicles, with an adhesive agent (42) for the removable attachment of the strip-shaped plastic profile (200; 300; 400; 500; 500'; 500") to the surface, wherein the plastic profile (200; 300; 400; 500; 500'; 500") is configured as a flat profile with a rectangular or a square cross section, whereby at least one corner area (40) of one of the two sides (14, 15) of the plastic profile (200; 500) running transversely to the profile longitudinal direction has a rounded profile area, or one of the two sides (14, 15) of the plastic profile (300) running transversely to the profile longitudinal direction has a rounded profile area, or a neck-shaped reduced section is molded on one of the two sides (14, 15) of the plastic profile (400) running transversely to the profile longitudinal direction and has a rounded profile area, wherein an adhesive coating (42) is provided in the rounded profile area;

wherein the plastic profile (500) is made of a profile (501) with a rectangular profile with longitudinal sides (10, 12) running parallel to each other and in profile longitudinal direction and with narrow sides (14, 15) running transversely to the profile longitudinal direction, a first narrow side (15) of the two narrow sides (14, 15) being rounded and the rounded section (511) showing an adhesive coating (42) and changing into a linearly running section (512) which runs obliquely to the second narrow side (14) and which is extended over the longitudinal side (10) of the profile (501) by constituting an approximately triangular surface section (515) and this changing with a section **(512*a*)**.

22. A plastic profile according to claim 21, wherein approximately half the length of the second narrow side (14) of the profile (501) is configured as an obliquely running section (520) having a step (525).

23. A plastic profile according to claim 22, wherein the obliquely running section (520) with the step (525) of the second narrow side (14) consists of two sections **(520*a*, 520*b*) offset to each other which are connected over a section (520*c*) which is at right angles to the sections (520*a*, 520*b*)**.

24. A plastic profile according to claim 23, wherein the obliquely running section **(520*b*) of the step (525) of the second narrow side (14), section which is adjacent to the longitudinal side (12) of the profile (501), has a shorter length than the obliquely running section (520*a*) adjacent to the section (14*a*) of the narrow side (14)** running transversely to the profile longitudinal direction.

25. A plastic profile according to claim 23, wherein both obliquely running sections **(520*a*, 520*b*) of the step (525) of the second narrow side (14) of the profile (501)** have the same length.

26. A plastic profile according to claim 21, wherein several plastic profiles (200; 300; 400; 500) are arranged in a row and connected with each other over tear-off edges (530, 531).

27. A plastic profile according to claim 26, wherein several plastic profiles arranged in a row (500) are connected with each other over tear-off edges (530, 531), both lateral sections (512, 520*b*) of a profile (501) running parallel to each other and showing the same length constituting the tear-off edges (530, 531) so that the plastic profiles (500) connected with each other over their lateral sections (512, 520*b*), have with reference to their longitudinal axes (LA), and angular position of 35° to 45° to the horizontal basis line (GL) which is constituted by the corner areas (540) in which the longitudinal sides (10) of the profiles (501) abroad together with their lateral sections (14*a*).

28. A plastic profile for the gap sealing of two car body parts (28, 30) of vehicles, especially for repair enameling work on vehicles, with an adhesive agent (42) for the removable attachment of the strip-shaped plastic profile (200; 300; 400; 500; 500'; 500") to the surface, wherein the plastic profile (200; 300; 400; 500; 500'; 500") is configured as a flat profile with a rectangular or a square cross section, whereby

- at least one corner area (40) of one of the two sides (14, 15) of the plastic profile (200; 500) running transversely to the profile longitudinal direction has a rounded profile area, or
- one of the two sides (14, 15) of the plastic profile (300) running transversely to the profile longitudinal direction has a rounded profile area, or
- a neck-shaped reduced section is molded on one of the two sides (14, 15) of the plastic profile (400) running transversely to the profile longitudinal direction and has a rounded profile area, wherein an adhesive coating (42) is provided in the rounded profile area;

wherein the plastic profile (500') shows an approximately rectangular cross section profile with the longitudinal sides (10, 12) and the narrow sides (14, 15) and a step-shaped taper (525, 555) is constituted in each narrow side area, the longitudinal side (12) of the profile changing into the upper narrow side (15) of the profile over a bow-shaped section (511) carrying an adhesive coating (42).

29. A plastic profile according to claim 28, the narrow side (14) of the profile changes into an ascending or an obliquely running section (525*a*) in direction to the longitudinal side (12) by constituting a step-shaped taper (525) and that a further short bow-shaped section (560*a*) follows the bow-shaped section (511) of the profile which supports the adhesive coating (42), bow-shaped section (560*a*) which changes into an obliquely running section (560*b*) which is followed by a section (560*c*) strongly inclined in direction to the narrow side (10) which changes into the narrow side (10) by constituting a step-shaped taper (555).

30. A plastic profile for the gap sealing of two car body parts (28, 30) of vehicles, especially for repair enameling work on vehicles, with an adhesive agent (42) for the removable attachment of the strip-shaped plastic profile (200; 300; 400; 500; 500'; 500") to the surface, wherein the plastic profile (200; 300; 400; 500; 500'; 500") is configured as a flat profile with a rectangular or a square cross section, whereby

- at least one corner area (40) of one of the two sides (14, 15) of the plastic profile (200; 500) running transversely to the profile longitudinal direction has a rounded profile area, or
- one of the two sides (14, 15) of the plastic profile (300) running transversely to the profile longitudinal direction has a rounded profile area, or
- a neck-shaped reduced section is molded on one of the two sides (14, 15) of the plastic profile (400) running transversely to the profile longitudinal direction and has a rounded profile area, wherein an adhesive coating (42) is provided in the rounded profile area;

wherein the plastic profile (500") shows an approximately rectangular cross section profile with the longitudinal sides (10, 12) and the narrow sides (14, 15) and a step-shaped taper (525) is configured in the narrow side area (14) in the transition area to the longitudinal side (12) and a step-shaped bulge (555') is configured in the narrow side area (15) in the transition area to the longitudinal side (10, the longitudinal side (12) of the profile changing into the upper narrow side (15) of the profile over a bow-shaped section (511) carrying an adhesive coating (42).

31. A plastic profile according to claim 30, the narrow side (14) of the profile changes into an ascending or an obliquely running section (525*a*) in direction to the longitudinal side (12) by constituting a step-shaped taper (525) and that a further short and flat bow-shaped section (560*a*) follows the bow-shaped section (511) of the profile which supports the adhesive coating (42), bow-shaped section (560*a*) which changes into an obliquely running section (560*a*') in direction of the longitudinal side (10) which is followed by a flat obliquely running section (560*b*) and which is followed by a strongly obliquely running section (560*c*) which changes into the longitudinal side (10) by constituting a step-shaped bulge (555') coming out from the longitudinal side (10) of the profile.

* * * * *